United States Patent
Ito

(10) Patent No.: US 12,510,369 B2
(45) Date of Patent: Dec. 30, 2025

(54) SYSTEM AND PROGRAM PRODUCT FOR CREATING VEHICLE DISPATCH PLAN

(71) Applicant: DENSO CORPORATION, Kariya (JP)

(72) Inventor: Yutaro Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 17/891,594

(22) Filed: Aug. 19, 2022

(65) Prior Publication Data

US 2023/0059112 A1     Feb. 23, 2023

(30) Foreign Application Priority Data

Aug. 19, 2021    (JP) ................................ 2021-134317

(51) Int. Cl.
    *G05D 1/00*           (2024.01)
    *G01C 21/34*         (2006.01)
    *G06Q 10/047*        (2023.01)
    *G06Q 50/40*         (2024.01)

(52) U.S. Cl.
    CPC ....... *G01C 21/3469* (2013.01); *G06Q 10/047* (2013.01); *G06Q 50/40* (2024.01)

(58) Field of Classification Search
    CPC ... G01C 21/3469; G06Q 50/40; G06Q 10/047
    See application file for complete search history.

(56) References Cited

U.S. PATENT DOCUMENTS

| | | | |
|---|---|---|---|
| 2014/0032035 A1 | 1/2014 | Thomson | |
| 2019/0086226 A1 | 3/2019 | Hamada et al. | |
| 2020/0324970 A1* | 10/2020 | Raizer | G05D 1/0027 |
| 2022/0163969 A1* | 5/2022 | Li | G05D 1/0291 |

FOREIGN PATENT DOCUMENTS

| | | |
|---|---|---|
| JP | H07-175504 A | 7/1995 |
| JP | H11-161697 A | 6/1999 |
| JP | 2005-207859 A | 8/2005 |
| JP | 2011-028353 A | 2/2011 |
| JP | 2021-002215 A | 1/2021 |
| WO | 2018/109899 A1 | 6/2018 |

\* cited by examiner

*Primary Examiner* — Gonzalo Laguarda
(74) *Attorney, Agent, or Firm* — Oliff PLC

(57) ABSTRACT

In a vehicle dispatch plan creating system, a calculator calculates, for each plan candidate, a value of an evaluation index for each vehicle assuming that the corresponding vehicle travels in accordance with the corresponding plan candidate. The evaluation index for each vehicle includes at least one of:

(i) an energy consumption of the corresponding vehicle;
   (ii) a quantity of carbon dioxide emissions from the corresponding vehicle; and
   (iii) a cost required for a travel of the corresponding vehicle.

The calculator calculates, for each plan candidate, the sum of the values of the evaluation index for the respective vehicles as a value of a candidate evaluation index for the corresponding plan candidate. A determiner determines one of the plan candidates as a vehicle dispatch plan. The determined one of the plan candidates has the lowest value of the candidate evaluation index in all the plan candidates.

11 Claims, 6 Drawing Sheets

| CANDIDATE ROUTE R1 | | |
|---|---|---|
| VEHICLE (TYPE) | TOTAL WEIGHT | EVALUATION INDEX |
| A1 | W1<br>W2<br>⋮<br>Wp | X1(A1)1<br>X1(A1)2<br>⋮<br>X1(A1)p |
| A2 | W1<br>W2<br>⋮<br>Wp | X1(A2)1<br>X1(A2)2<br>⋮<br>X1(A2)p |
| ⋯ | ⋯ | ⋯ |
| Am | W1<br>W2<br>⋮<br>Wp | X1(Am)1<br>X1(Am)2<br>⋮<br>X1(Am)p |

⋮

Tn

| CANDIDATE ROUTE Rn | | |
|---|---|---|
| VEHICLE (TYPE) | TOTAL WEIGHT | EVALUATION INDEX |
| A1 | W1<br>W2<br>⋮<br>Wp | Xn(A1)1<br>Xn(A1)2<br>⋮<br>Xn(A1)p |
| A2 | W1<br>W2<br>⋮<br>Wp | Xn(A2)1<br>Xn(A2)2<br>⋮<br>Xn(A2)p |
| ⋯ | ⋯ | ⋯ |
| Am | W1<br>W2<br>⋮<br>Wp | Xn(Am)1<br>Xn(Am)2<br>⋮<br>Xn(Am)p |

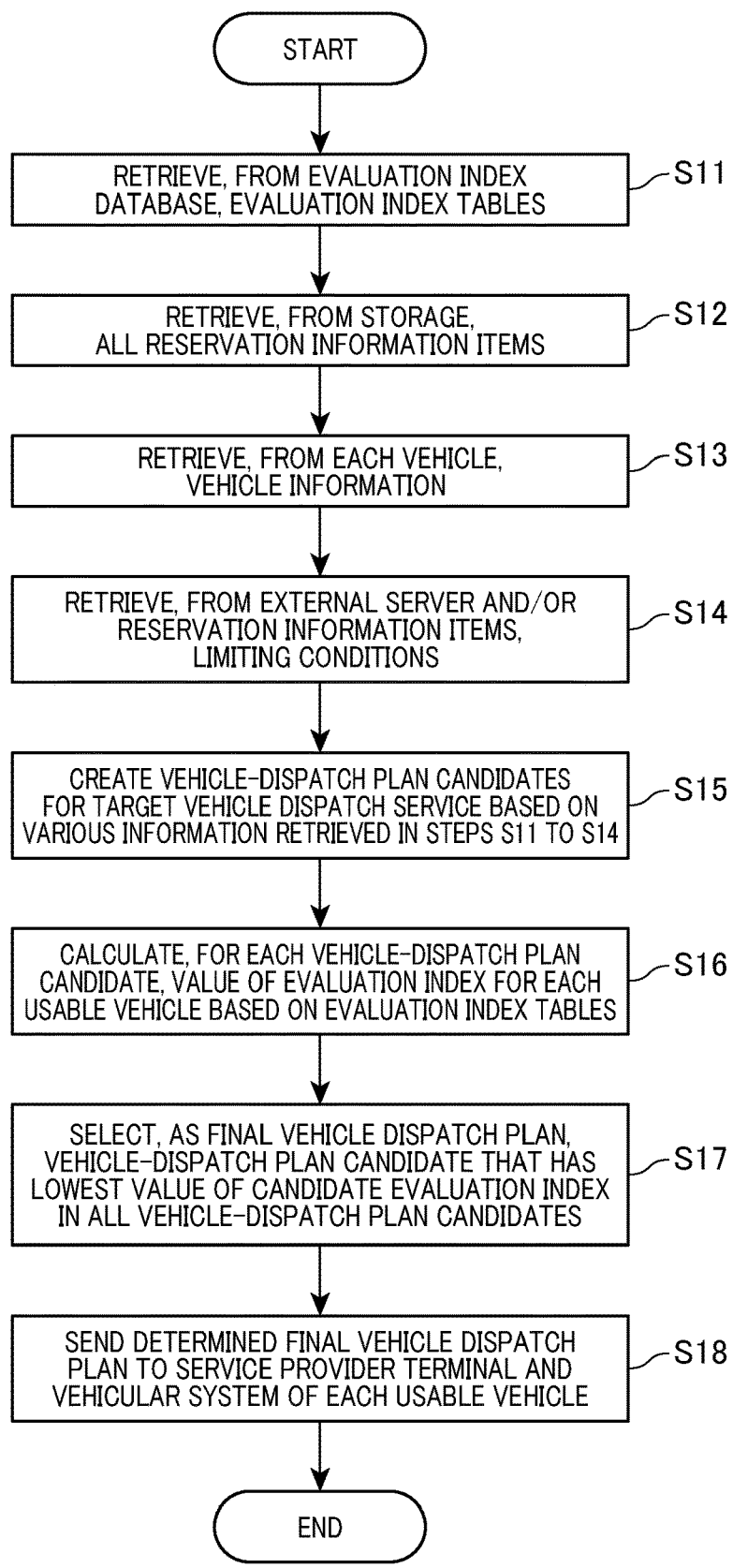

SYSTEM AND PROGRAM PRODUCT FOR CREATING VEHICLE DISPATCH PLAN

CROSS-REFERENCE TO RELATED APPLICATION

This application is based on and claims the benefit of priority from earlier Japanese Patent Application No. 2021-134317 filed on Aug. 19, 2021, the entire disclosure of which is incorporated herein by reference.

TECHNICAL FIELD

The present disclosure relates to systems and program products for creating a vehicle dispatch plan.

BACKGROUND

There are services that cause plural vehicles to successively travel through predetermined waypoints or stops. These services are needed to cause the vehicles to travel as efficiently as possible while meeting the user's demands.

SUMMARY

In a vehicle dispatch plan creating system according to one aspect of the present disclosure, a calculator calculates, for each plan candidate, a value of an evaluation index for each vehicle assuming that the corresponding vehicle travels in accordance with the corresponding plan candidate. The evaluation index for each vehicle includes at least one of
  (i) An energy consumption of the corresponding vehicle
  (ii) A quantity of carbon dioxide emissions from the corresponding vehicle
  (iii) A cost required for a travel of the corresponding vehicle The calculator calculates, for each plan candidate, the sum of the values of the evaluation index for the respective vehicles as a value of a candidate evaluation index for the corresponding plan candidate. A determiner determines one of the plan candidates as a vehicle dispatch plan. The determined one of the plan candidates has the lowest value of the candidate evaluation index in all the plan candidates.

BRIEF DESCRIPTION OF THE DRAWINGS

Other aspects of the present disclosure will become apparent from the following description of embodiments with reference to the accompanying drawings in which:

FIG. 4B is a diagram schematically illustrating evaluation index tables for respective first to nth candidate routes according to the exemplary embodiment; and FIG. 5 is a flowchart schematically illustrating an example of a vehicle dispatch plan creating routine carried out by a processor illustrated in FIG. 2.

DETAILED DESCRIPTION OF EMBODIMENTS

Figure 1:
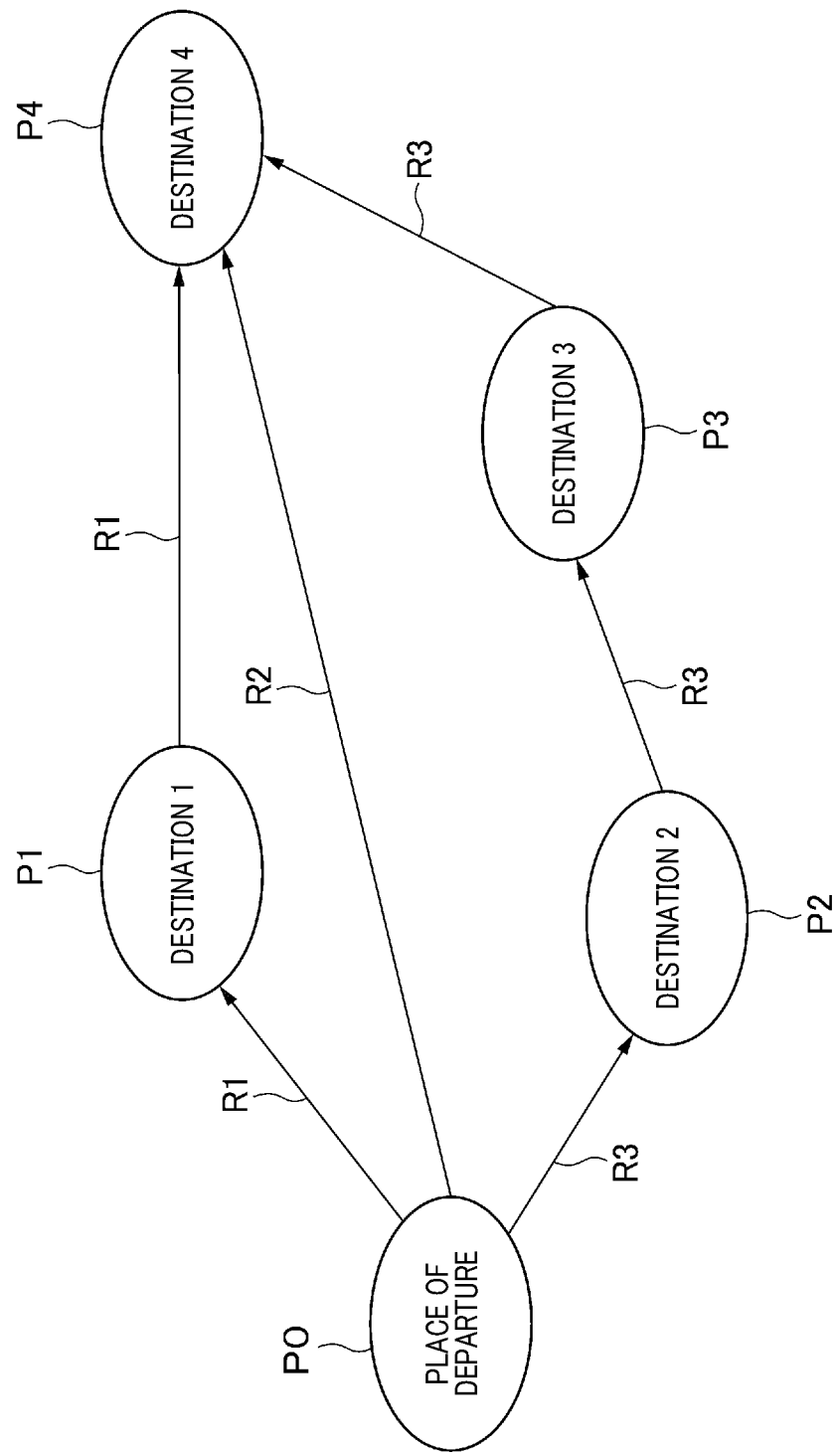
FIG. 1 is a diagram used to describe an example of a vehicle dispatch service that can be provided by a vehicle dispatch plan creating system according to an exemplary embodiment of the present disclosure.

There are services that cause plural vehicles to successively travel through predetermined waypoints or stops. These services are needed to cause the vehicles to travel as efficiently as possible while meeting the user's demands. From this viewpoint, a proposed method creates a vehicle dispatch plan that represents how vehicles are scheduled to travel, and causes the vehicles to travel in accordance with the created vehicle dispatch plan.

For example, Japanese Patent Application Publication No. 2011-28353 discloses a method that creates a vehicle dispatch plan to reduce the total fuel consumption by vehicles that are scheduled to travel through predetermined waypoints in accordance with the created vehicle dispatch plan.

Specifically, the method, i.e., the plan creating method, disclosed in the patent publication categorizes the waypoints into at least a first waypoint group and a second waypoint group. The total distance required for a vehicle to travel through all the waypoints included in the first waypoint group is longer than that required for a vehicle to travel through all the waypoints included in the second waypoint group.

Then, the plan creating method creates a vehicle dispatch plan that allocates a first group of vehicles to the first waypoint group, and a second group of vehicles to the second waypoint group; each vehicle included in the first group has a predetermined fuel efficiency that is lower than that of each vehicle included in the second group. This aims to reduce the total fuel consumption by all the vehicles included in the first and second groups.

The fuel efficiency of each scheduled vehicle varies depending on various factors including, for example, slopes of roads where the corresponding scheduled vehicle travels and/or whether there are traffic jams on the roads where the corresponding scheduled vehicle travels.

Unfortunately, the above patent publication fails to mention these variation factors. For this reason, the plan creating method disclosed in the patent publication seems to perform allocation of each vehicle in accordance with the predetermined fuel efficiency of the corresponding vehicle that has been tested in an authoritatively established test mode, such as a Worldwide harmonized Light duty driving Test Cycle (WLTC) mode.

That is, because the plan creating method disclosed in the patent publication fails to consider the various factors that cause the fuel efficiencies of the vehicles to vary, some vehicle dispatch plans created by the plan creating method disclosed in the patent publication may result in, for example, unsatisfactory vehicle dispatch efficiency, such as unsatisfactory reduction in consumption energy of each scheduled vehicle.

From this viewpoint, the present disclosure aims to provide systems and program products for creating a vehicle dispatch plan, each of which enables created vehicle dispatch plans to improve vehicle dispatch efficiency, such as satisfactory reduction in an energy consumption of each scheduled vehicle.

A system for creating a vehicle dispatch plan that represents how a plurality of vehicles are scheduled to travel according to a first aspect of the present disclosure includes a candidate creator, a calculator, and a determiner.

The candidate creator is configured to create, as vehicle-dispatch plan candidates, a plurality of candidates for the vehicle dispatch plan.

The calculator is configured to calculate, for each of the vehicle-dispatch plan candidates, a value of an evaluation index for each vehicle assuming that the corresponding vehicle travels in accordance with the corresponding one of the vehicle-dispatch plan candidates, the evaluation index for each vehicle including at least one of
 (i) An energy consumption of the corresponding vehicle;
 (ii) A quantity of carbon dioxide emissions from the corresponding vehicle
 (iii) A cost required for a travel of the corresponding vehicle The calculator is configured to calculate, for each of the vehicle-dispatch plan candidates, the sum of the values of the evaluation index for the respective vehicles as a value of a candidate evaluation index for the corresponding one of the vehicle-dispatch plan candidates.

The determiner is configured to determine one of the vehicle-dispatch plan candidates as the vehicle dispatch plan, the determined one of the vehicle-dispatch plan candidates having the lowest value of the candidate evaluation index in all the vehicle-dispatch plan candidates.

A program product for at least one processor for creating a vehicle dispatch plan that represents how a plurality of vehicles are scheduled to travel according to a second aspect of the present disclosure includes a non-transitory processor-readable medium. The program product includes a set of program instructions embedded in the processor-readable medium.

The instructions cause the at least one processor to:
 create, as vehicle-dispatch plan candidates, a plurality of candidates for the vehicle dispatch plan;
 calculate, for each of the vehicle-dispatch plan candidates, a value of an evaluation index for each vehicle assuming that the corresponding vehicle travels in accordance with the corresponding one of the vehicle-dispatch plan candidates, the evaluation index for each vehicle including at least one of:
 (i) an energy consumption of the corresponding vehicle;
 (ii) a quantity of carbon dioxide emissions from the corresponding vehicle; and
 (iii) a cost required for a travel of the corresponding vehicle; and
 calculate, for each of the vehicle-dispatch plan candidates, the sum of the values of the evaluation index for the respective vehicles as a value of a candidate evaluation index for the corresponding one of the vehicle-dispatch plan candidates; and
 determine one of the vehicle-dispatch plan candidates as the vehicle dispatch plan, the determined one of the vehicle-dispatch plan candidates having the lowest value of the candidate evaluation index in all the vehicle-dispatch plan candidates.

The evaluation index recited in each of the first and second aspects represents an index, such as the energy consumption for each vehicle assuming that the corresponding vehicle travels in accordance with the corresponding one of the vehicle-dispatch plan candidates.

That is, the calculator or the calculating step calculates, for each of the vehicle-dispatch plan candidates, a value of the evaluation index for each vehicle assuming that the corresponding vehicle travels in accordance with the corresponding one of the vehicle-dispatch plan candidates, and calculates, for each of the vehicle-dispatch plan candidates, the sum of the values of the evaluation index for the respective vehicles as a value of the candidate evaluation index for the corresponding one of the vehicle-dispatch plan candidates.

Then, the determiner or the determining step determines one of the vehicle-dispatch plan candidates as the vehicle dispatch plan, the determined one of the vehicle-dispatch plan candidates having the lowest value of the candidate evaluation index in all the vehicle-dispatch plan candidates.

Each of the first and second aspects therefore enables sufficient reduction of the energy consumption of the vehicles resulting from provision of the target vehicle dispatch service.

The following describes an exemplary embodiment of the present disclosure with reference to the accompanying drawings. In the drawings, elements, which are structurally and/or functionally identical to one another, are each assigned with a common reference character, and duplicated descriptions of the structurally and/or functionally identical elements are omitted for the sake of facilitating the understanding of the exemplary embodiment.

Figure 2:
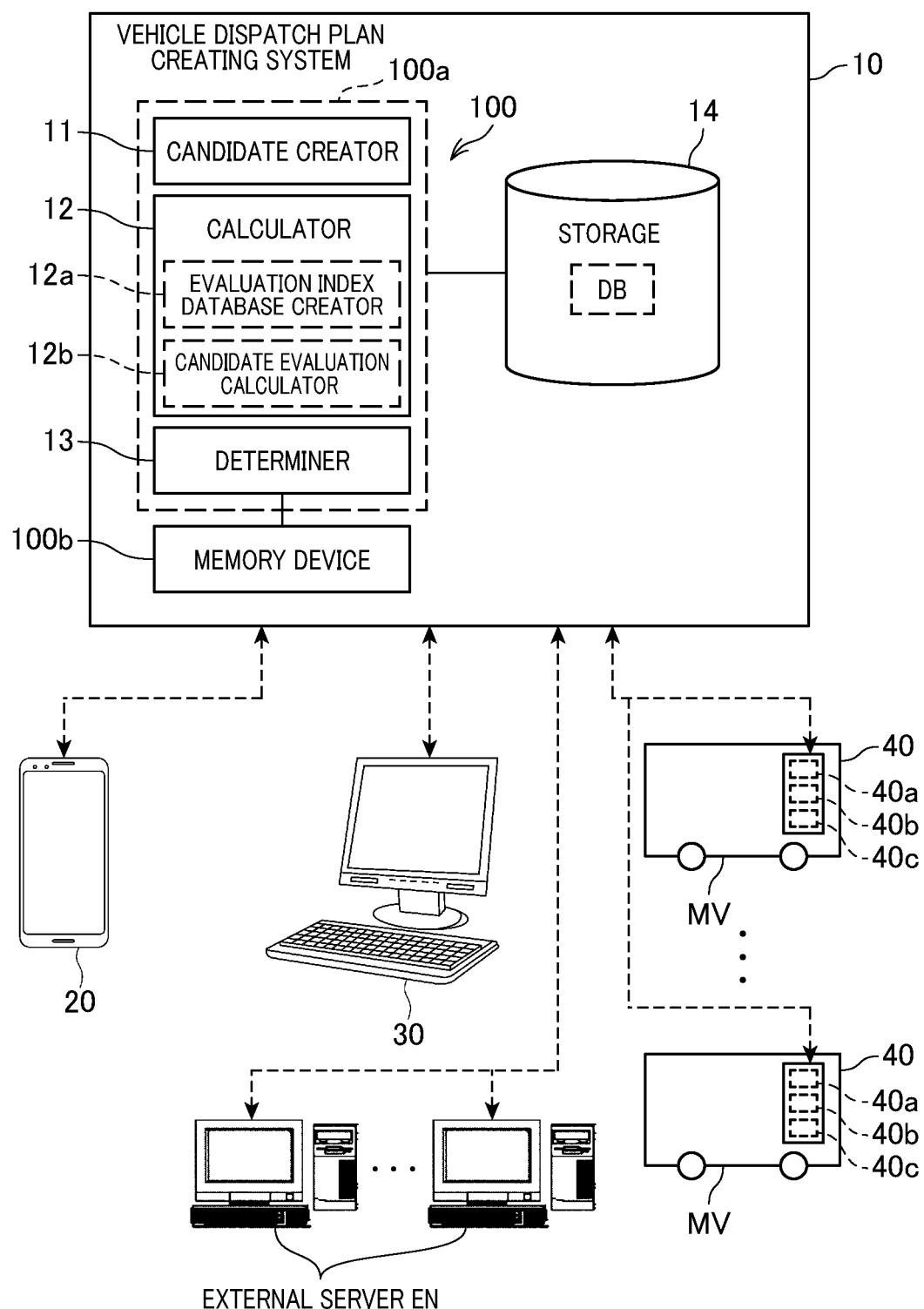
FIG. 2 is a block diagram schematically illustrating an example of the configuration of the vehicle dispatch plan creating system according to the exemplary embodiment.

A vehicle dispatch plan creating system 10 according to the exemplary embodiment is configured to create vehicle dispatch plans used for vehicle dispatch services that dispatch vehicles MV (see FIG. 2). Let us schematically describe, in advance of description of the vehicle dispatch plan creating system 10, an example of these vehicle dispatch services with reference to FIG. 1.

An example vehicle dispatch service according to the exemplary embodiment is configured to cause the vehicles MV, which are unillustrated in FIG. 1, to successively travel through predetermined waypoints previously established in a predetermined service region to accordingly transport loads in accordance with user's requests. The loads to be transported include users, i.e., humans, themselves and cargoes except for humans. The example vehicle dispatch service illustrated in FIG. 1 transports users themselves as the loads to be transported. The loads to be transported according to the exemplary embodiment will also be referred to as passengers.

Each vehicle MV can be configured as any one of (i) a first type vehicle driven based on drive power generated by an internal combustion engine installed therein, (ii) a second type vehicle driven based on drive power generated by a rotary electric machine installed therein, or (iii) a third type vehicle equipped with both an internal combustion engine and a rotary electric machine installed therein. The vehicles MV used for the vehicle dispatch services according to the exemplary embodiment can include these first to third types of vehicles.

In FIG. 1, the waypoints used for the example vehicle dispatch service are respectively illustrated as reference characters P0, P1, P2, P3, and P4. That is, each of the waypoints P0 to P4 represents a stopping place where each of the vehicles MV stops to pick up or discharge one or more passengers.

The example vehicle dispatch service illustrated in FIG. 1 is configured such that all the vehicles MV leave the waypoint P0 as the place of departure for the waypoint P4 as its final destination.

For example, a first group of vehicles included in the vehicles MV are scheduled to travel from the waypoint P0 to the waypoint P1 through a route R1$a$ and thereafter travel from the waypoint P1 to the waypoint P4 through a route R1$b$.

A second group of vehicles included in the vehicles MV are scheduled to travel directly from the waypoint P0 to the waypoint P4 through a route R2.

A third group of vehicles included in the vehicles MV are scheduled to travel from the waypoint P0 to the waypoint P2 through a route R3a and thereafter travel from the waypoint P2 to the waypoint P3 through a route R3c and thereafter travel from the waypoint P3 to the waypoint P4 through a route R3c.

A user can embark on, i.e., get on, one of the first group vehicles at the waypoint P0, and can disembark off, i.e., get off, the one of the first group vehicles at the waypoint P1 or P4, and a user can embark on one of the first group vehicles at the waypoint P1, and can disembark off the one of the first group vehicles at the waypoint P4.

A user can embark on one of the second group vehicles at the waypoint P0, and can disembark off the one of the second group vehicles at the waypoint P4.

A user can embark on one of the third group vehicles at the waypoint P0, and can disembark off the one of the third group vehicles at the waypoint P2, P3, or P4, and a user can embark on one of the third group vehicles at the waypoint P2, and can disembark off the one of the third group vehicles at the waypoint P3 or waypoint P4. Additionally, a user can embark on one of the third group vehicles at the waypoint P3, and can disembark off the one of the third group vehicles at the waypoint P4.

As described above, because all the vehicles MV in the example vehicle dispatch service illustrated in FIG. 1 are scheduled to leave the waypoint P0, the label "PLACE OF DEPARTURE" is assigned to the waypoint P0. Because all users, which use the example vehicle dispatch service illustrated in FIG. 1, disembark off any one of the waypoints P1, P2, P3, and P4, the label "DESTINATION 1", label "DESTINATION 2", label "DESTINATION 3", and label "DESTINATION 4" are assigned to the respective waypoints P1, P2, P3, and P4.

The vehicle dispatch service illustrated in FIG. 1 is an example, and therefore, various vehicle dispatch services can be provided based on various vehicle dispatch plans created by the vehicle dispatch plan creating system 10.

That is, the place of departure and the destinations for each vehicle MV used in each vehicle dispatch service can be individually determined for the corresponding vehicle MV.

For example, at least one of the vehicles MV can be scheduled to leave the waypoint P2 as the place of departure for the waypoint P0 as its final destination. In addition, each vehicle MV can be controlled not to stop at one of the waypoints if there are no passengers to embark on or off the corresponding vehicle MV.

How to cause each vehicle MV to travel through one or more routes usable by the corresponding vehicle MV is variably determined in accordance with requests of users that use a vehicle dispatch service.

In view of these circumstances, the vehicle dispatch plan creating system 10 is configured to create a vehicle dispatch plan in advance of provision of a target vehicle dispatch service to users; the vehicle dispatch plan represents how vehicles usable in the vehicles MV are scheduled to travel through one or more routes available by the vehicles MV.

The vehicle dispatch plan created by the vehicle dispatch plan creating system 10 can include (1) First information about how each vehicle usable in the vehicles MV is scheduled to travel through waypoints selected from all the waypoints that are disposed in the predetermined service region and are travelable by the vehicles MV, that is, through routes selected from all the routes that are disposed in the predetermined service region and are travelable by the vehicles MV (2) Second information about the number of passengers, for each of the waypoints selected by the usable vehicles, who embark on or disembark off at least one of the usable vehicles when the at least one of the usable vehicles stops at the corresponding one of the waypoints selected by the usable vehicles In other words, the vehicle dispatch plan created by the vehicle dispatch plan creating system 10 can include, as the second information, information about, for each of the routes selected by the usable vehicles, the number of loads, i.e., passengers, carried out by at least one of the usable vehicles when the at least one of the usable vehicles travels through the corresponding one of the routes selected by the usable vehicles.

The vehicle dispatch plan created by the vehicle dispatch plan creating system 10 can include information about a range of carrier routes included in the selected routes for each vehicle MV when the corresponding vehicle should travel through the range of the carrier routes while carrying at least one load, i.e., at least one passenger.

Both the number of the selected waypoints that can be traveled by the vehicles MV and the location of each of the waypoints are fixedly determined as a precondition for creating a vehicle dispatch plan; information indicative of both the number of the selected waypoints that can be traveled by the vehicles MV and the location of each of the waypoints has been already stored in the vehicle dispatch plan creating system 10

A route from one of any pair of the waypoints to the other thereof is fixedly determined as a precondition for creating a vehicle dispatch plan; information indicative of the route from one of any pair of the waypoints to the other thereof has been already stored in the vehicle dispatch plan creating system 10. There can be various routes from one of any pair of the waypoints to the other thereof, and information indicative of the various routes from one of any pair of the waypoints to the other thereof can have been already stored in the vehicle dispatch plan creating system 10.

The vehicle dispatch plan creating system 10 according to the exemplary embodiment is configured to create, in accordance with user's reservation information items inputted thereto, a vehicle dispatch plan that satisfies all the user's demands included in the user's reservation information items while, for example, reducing consumption energy needed by execution of the created vehicle dispatch plan as low as possible.

The following describes an example of the configuration of the vehicle dispatch plan creating system 10 with reference to FIG. 2.

The vehicle dispatch plan creating system 10 is designed as, for example, a computer system comprised of a processor apparatus 100 that includes a processor, such as a central processing unit (CPU) 100a, a memory device 100b that includes a random-access memory (RAM), a read-only memory (ROM), and/or another memory; the ROM is an example of a non-transitory storage medium.

In particular, the vehicle dispatch plan creating system 10 is configured as a cloud server located at, for example, a remote location from a service-provider terminal 30, which will be described later, of a vehicle-dispatch service provider, which will be referred to simply as a service provider.

Specifically, the vehicle dispatch plan creating system 10 is configured to create, for the service provider, a vehicle dispatch plan that satisfies all user's requests sent thereto.

Alternatively, the vehicle dispatch plan creating system 10 can be configured as a server specially for the service provider.

The processor 100a of the vehicle dispatch plan creating system 10 functionally includes, for example, a candidate creator 11, a calculator 12, a determiner 13, and a storage 14.

For example, the above components 11, 12, and 13 respectively show functions included in the vehicle dispatch plan creating system 10, and therefore these components 11, 12, and 13 are illustrated as individual blocks 11, 12, and 13 in FIG. 2.

At least part of all functions, which include the functions 11, 12, and 13, provided by the vehicle dispatch plan creating system 10 can be implemented by at least one processor; the at least one processor can be comprised of
 (1) The combination of at least one programmable processing unit, i.e., at least one programmable logic circuit, and at least one memory
 (2) At least one hardwired logic circuit
 (3) At least one hardwired-logic and programmable-logic hybrid circuit Specifically, the vehicle dispatch plan creating system 10 is configured such that the processor 100a performs instructions of programs stored in the memory device 100b, thus implementing at least the functional components 11, 12, and 13.

The candidate creator 11 serves to create, for the service provider, vehicle-dispatch plan candidates in accordance with reservation information items on users. Each of the created vehicle-dispatch plan candidates enables each of passengers who request, in the reservation information items, transportation from an individual place of departure to an individual destination, i.e., an individual target place.

In particular, the candidate creator 11 according to the exemplary embodiment is configured to create, for the service provider, all the vehicle-dispatch plan candidates that are implementable under predetermined limiting conditions. A predetermined upper limit can be deter mined to the number of vehicle-dispatch plan candidates to be created by the candidate creator 11 for the service provider.

Each vehicle-dispatch plan candidate created by the candidate creator 11, which satisfies all the reservation information items, can include
 (1) First information about how each vehicle usable in the vehicles MV is scheduled to travel through waypoints selected from all the waypoints that are disposed in the predetermined service region and are travelable by the vehicles MV, that is, through routes selected from all the routes that are disposed in the predetermined service region and are travelable by the vehicles MV
 (2) Second information about the number of passengers, for each of the waypoints selected by the usable vehicles, who embark on or disembark off at least one of the usable vehicles when the at least one of the usable vehicles stops at the corresponding one of the waypoints selected by the usable vehicles In other words, each vehicle dispatch plan candidate created by the candidate creator 11 can include, as the second information, information about, for each of the routes selected by the usable vehicles, the number of loads, i.e., passengers, carried out by at least one of the usable vehicles when the at least one of the usable vehicles travels through the corresponding one of the routes selected by the usable vehicles.

Each vehicle dispatch plan candidate created by the candidate creator 11 can include information about a range of carrier routes included in the selected routes for each vehicle MV when the corresponding vehicle MV should travel through the range of the carrier routes while carrying at least one load, i.e., at least one passenger.

The calculator 12 includes an evaluation index database creator 12a and a candidate evaluation index calculator 12b.

As described above, there are plural routes available by the vehicles MV when each of the vehicles MV travels from the corresponding place of departure, such as the waypoint P0, to the corresponding final destination, such as the waypoint P4. Each of the routes therefore joins a corresponding pair of the waypoints P0 to P4. The routes can be therefore included in each of the vehicle-dispatch plan candidates created by the candidate creator 11. The routes, each of which joins a corresponding pair of the waypoints, such as the waypoints P0 to P4, which are useable by each of the vehicle-dispatch plan candidates, will be therefore referred to as candidate routes.

The evaluation index database creator 12a is configured to calculate, for each candidate route available for the target vehicle dispatch service, a value of an evaluation index for each vehicle MV assuming that the corresponding vehicle MV travels through the corresponding candidate route, and collect the values of the evaluation index for the respective vehicles MV for each route as an evaluation index table. That is, the evaluation index table for each candidate route represents a relationship between the values of the evaluation index for the respective vehicles MV and the corresponding candidate route.

The evaluation index for each vehicle MV for each candidate route represents, assuming that the corresponding vehicle MV travels through the corresponding candidate route, one of (i) the energy consumption of the corresponding vehicle MV, (ii) the quantity of carbon dioxide emissions from the corresponding vehicle MV, and (iii) the cost required for the travel of the corresponding vehicle MV.

A value of the evaluation index for each vehicle MV for each candidate route can represent one of an actual dimensional value of the energy consumption of the corresponding vehicle MV, an actual dimensional value of the quantity of carbon dioxide emissions from the corresponding vehicle MV, and an actual dimensional value of the cost required for the travel of the corresponding vehicle MV. Alternatively, a value of the evaluation index for each vehicle MV for each candidate route can represent one of
 1. A non-dimensional value of the energy consumption of the corresponding vehicle MV, such as the product of the dimensional value of the energy consumption of the corresponding vehicle MV and a predetermined coefficient
 2. A non-dimensional value of the quantity of carbon dioxide emissions from the corresponding vehicle MV, such as the product of the dimensional quantity of carbon dioxide emissions from the corresponding vehicle MV and a predetermined coefficient
 3. A non-dimensional value of the cost required for the travel of the corresponding vehicle MV, such as the product of the dimensional value of the cost required for the travel of the corresponding vehicle MV and a predetermined coefficient Then, the evaluation index database creator 12a is configured to collect the evaluation index tables for the respective candidate routes to accordingly create an evaluation index database DB based on the collected evaluation index tables for the respective candidate routes. Additionally, the evaluation index database creator 12a is configured to store the evaluation index database DB in the storage 14.

The candidate evaluation calculator 12b is configured to calculate, for each vehicle-dispatch plan candidate created by the candidate creator 11, a value of the evaluation index for each vehicle usable in the vehicles MV, based on the evaluation index database DB assuming that the corresponding suable vehicle travels in accordance with the corresponding vehicle-dispatch plan candidate.

Then, the candidate evaluation calculator 12b is configured to calculate, for each vehicle-dispatch plan candidate created by the candidate creator 11, the sum of the calculated values of the evaluation index to accordingly obtain, for each vehicle-dispatch plan candidate created by the candidate creator 11, the calculated sum of the values of the evaluation index as a value of a candidate evaluation index for the corresponding vehicle-dispatch plan candidate created by the candidate creator 11.

The determiner 13 serves to determine one of the vehicle-dispatch plan candidates created by the candidate creator 11 for the service provider as a final vehicle dispatch plan for the service provider.

Specifically, the determiner 13 according to the exemplary embodiment is configured to select one of the vehicle-dispatch plan candidates created by the candidate creator 11 for the service provider; the selected one of the vehicle-dispatch plan candidates has the lowest value of the candidate evaluation index in all the vehicle-dispatch plan candidates created by the candidate creator 11 for the service provider. Then, the determiner 13 according to the exemplary embodiment is configured to determine the selected one of the vehicle-dispatch plan candidates created by the candidate creator 11 for the service provider as the final vehicle dispatch plan for the service provider.

That is, the final vehicle dispatch plan determined by the determiner 13 for the service provider represents a vehicle dispatch plan created by the vehicle dispatch plan creating system 10 for the service provider, and therefore the target vehicle dispatch service is performed by the service provider in accordance with the vehicle dispatch plan created by the vehicle dispatch plan creating system 10 for the service provider.

The storage 14 is a nonvolatile storage device, such as a hard-disc drive (HDD) or a solid-state drive (SSD).

Specifically, the storage 14 according to the exemplary embodiment is configured to store the evaluation index database DB calculated by the evaluation index database creator 12a.

As described above, the evaluation index table for each candidate route included in the evaluation index database DB represents a relationship between the values of the evaluation index for the respective vehicles MV and the corresponding candidate route.

Because each vehicle MV has a predetermined model or type, the evaluation index table for each candidate route included in the evaluation index database DB represents, in other words, a relationship between the values of the evaluation index for the respective models (types) of the vehicles MV and the corresponding candidate route.

Additionally, because each vehicle MV can have one of total weights depending on its own weight and the weight of at least one load to be transported by the corresponding vehicle MV, such as at least one passenger embarking on the corresponding vehicle MV according to the exemplary embodiment, the evaluation index table for each candidate route included in the evaluation index database DB represents, in other words, a relationship between the values of the evaluation index for the respective total weights of the vehicles MV and the corresponding candidate route.

Specifically, the vehicle dispatch plan creating system 10 according to the exemplary embodiment is configured to previously calculate the evaluation index database DB including the relationship between the values of the evaluation index for the respective vehicles MV and each candidate route, and previously store the evaluation index database DB in the storage 14.

This configuration of the vehicle dispatch plan creating system 10 enables a value of the candidate evaluation index for each vehicle-dispatch plan candidate created by the candidate creator 11 to be calculated over a relatively shorter time, and therefore enables the final vehicle dispatch plan to be calculated over a relatively shorter time.

As described later, the evaluation index database creator 12a is configured to occasionally or periodically update at least part of the evaluation index database DB in accordance with, for example, traffic jam information about each candidate route between the waypoint P0 as the place of departure and the waypoint P4 as its final destination.

FIG. 2 additionally illustrates, as apparatuses wirelessly communicable with the vehicle dispatch plan creating system 10, mobile communication terminals 20, the service-provider terminal 30, vehicular systems 40 installed in the respective vehicles MV, and plural external servers EX.

Each of the mobile communication terminals 20 is configured as a mobile computer terminal carried by a corresponding user of the target vehicle dispatch service to be provided by the service provider. Each user operates the corresponding mobile communication terminal 20 to thereby send, from the corresponding mobile communication terminal 20 to the vehicle dispatch plan creating system 10 by radio, a reservation information item. The reservation information item sent from each mobile communication terminal 20 includes 1. The number of passengers who are going to embark on any one of the vehicles MV if the at least one passenger is at least one load to be transported by any one of the vehicles MV
2. An embarkation waypoint selected from the waypoints P0 to P4 where the at least one passenger is going to embark on any one of the vehicles MV
3. A disembarkation waypoint selected from the waypoints P0 to P4 where the at least one passenger is going to disembark off the selected one of the vehicles MV The reservation information items are sent from the mobile communication terminals 20 to the vehicle dispatch plan creating system 10 at least a predetermined period before the start of providing the target vehicle dispatch service to the users. The reservation information items are stored in, for example, the storage 14. If the at least one load to be transported by any one of the vehicles MV is at least one cargo, the reservation information additionally includes the weight of the at least one cargo.

The service-provider terminal 30 is configured as a communication control terminal possessed by the service provider who provides the target vehicle dispatch service to the users. The service provider operates the service-provider terminal 30 to thereby send, from the service-provider terminal 30 to the vehicle dispatch plan creating system 10 by radio, a schedule creating request. This causes the vehicle dispatch plan creating system 10 to create a vehicle dispatch plan as described above, and send the created vehicle dispatch plan to the service-provider terminal 30.

In response to receiving the vehicle dispatch plan, the service provider operates the service-provider terminal 30 to send, to the vehicular system 40 of each vehicle MV by radio, individual drive instructions in accordance with the created vehicle dispatch plan. The vehicle dispatch plan creating system 10 can be configured to send, to the vehicular system 40 of each vehicle MV by radio, the individual drive instructions in accordance with the created vehicle dispatch plan.

The vehicular system 40 installed in each vehicle MV serves as a communication control terminal that has a controller 40a, a display 40b, and an audio device 40c. The controller 40a receives the individual drive instructions in accordance with the created vehicle dispatch plan sent from the service-provider terminal 30 or the vehicle dispatch plan creating system 10. Then, the controller 40a displays the individual drive instructions on the display 40b and audibly outputs, through the audio device 40c, the individual drive instructions. The individual drive instructions displayed on the display 40b of each vehicle MV and audibly outputted through the audio device 40c of the corresponding vehicle MV enable the corresponding vehicle MV to travel in accordance with the created vehicle dispatch plan.

Each of the external servers EN is a computer system that stores a large volume of information and periodically keeps the large volume of information up-to-date; the large volume of information is accessible by the vehicle dispatch plan creating system 10.

For example, the external servers EN include a map information server EN and a traffic information server EN.

The map information server EN stores map information about many routes, i.e., roads, which includes the candidate routes located between the waypoint P0, i.e., the place of departure, and the waypoint P4 as its final destination.

The map information for example includes route information for each candidate route.

The route information for each candidate route includes at least (i) the global location of each point defined along the corresponding candidate route, such as the latitude, longitude, and height of each point defined along the corresponding candidate route, and/or (ii) the profile, such as the slope and/or curvature, of each point defined along the corresponding candidate route. Because the profile of each point defined along each candidate route can be calculated based on the global location of the corresponding point defined along the corresponding candidate route, the profile of each point defined along each candidate route can be eliminated from the route information.

The route information for each candidate route also includes the locations of traffic lights included in the corresponding candidate route.

The traffic information server EN stores traffic information that includes (i) speed limit information and (ii) the traffic jam information about each candidate route.

The speed limit information about each candidate route includes, for example, a value of the legal speed limit on each point defined along the corresponding candidate route. The traffic jam information about each candidate route for example includes (i) Whether there is a traffic jam on each point defined along the corresponding candidate route (ii) The degree of, upon determination that there is a traffic jam on at least one point defined along at least one candidate route, the traffic jam on the at least one point defined along the at least one candidate route The following describes an evaluation index database creating routine carried out by the processor apparatus 100, i.e., the processor 100a, with reference to FIG. 3.

Figure 3:
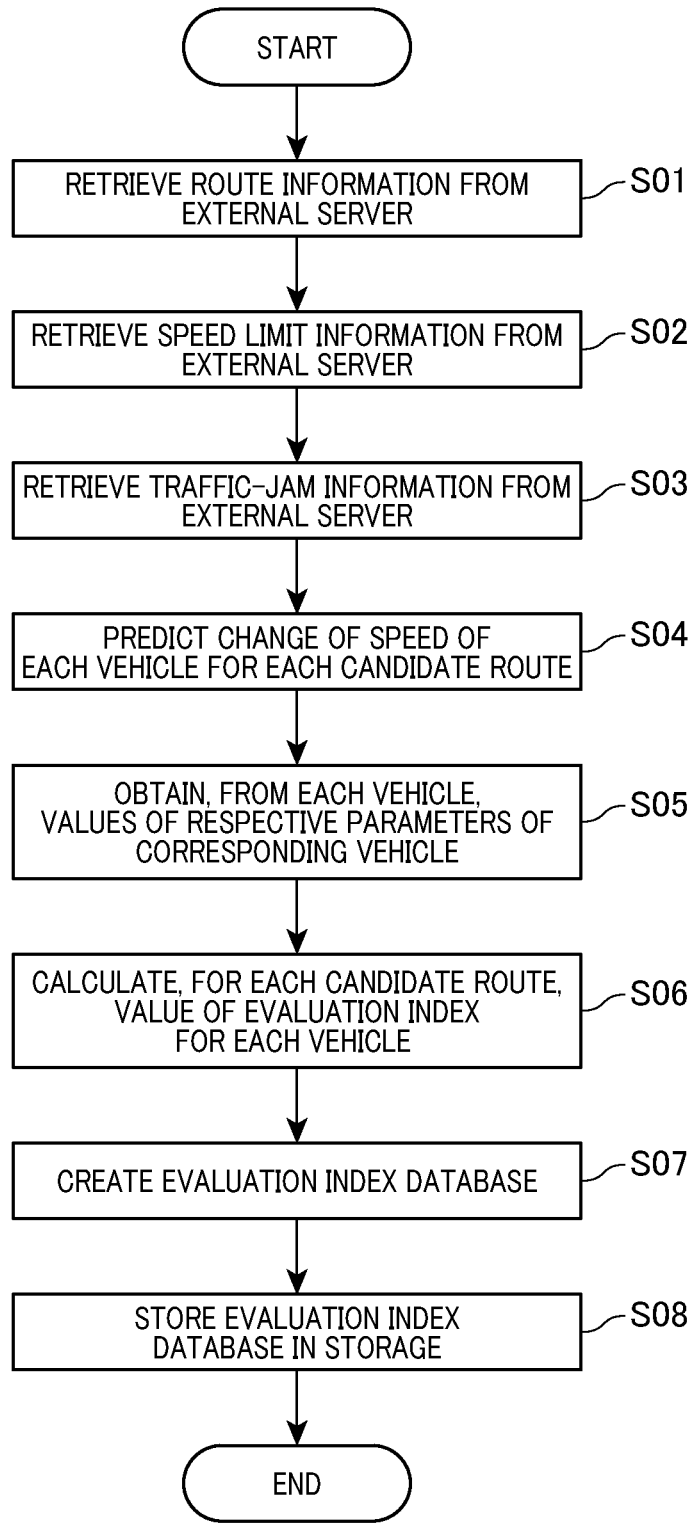
FIG. 3 is a flowchart schematically illustrating an example of an evaluation index database creating routine carried out by a processor illustrated in FIG. 2.

Specifically, the processor 100a is programmed to perform the evaluation index database creating routine illustrated in FIG. 3 at a point of time before the rollout of the target vehicle dispatch service from the service provider.

For example, the processor 100a can be programmed to perform, only once, the evaluation index database creating routine within a period before the rollout of the target vehicle dispatch service from the service provider, or repeatedly perform, every predetermined cycle, the evaluation index database creating routine within the period before the rollout of the target vehicle dispatch service from the service provider.

When launching the evaluation index database creating routine, the processor 100a of the processor apparatus 100 serves as, for example, the evaluation index database creator 12a to access the map information server EN to thereby retrieve, from the map information server EN, the route information for each candidate route in step S01. That is, as described above, each of the candidate routes, which can be included in each of the vehicle-dispatch plan candidates created by the candidate creator 11, joins a corresponding pair of the waypoints P0 to P4.

Following the operation in step S01, the processor 100a serves as, for example, the evaluation index database creator 12a to access the traffic information server EN to thereby retrieve, from the traffic information server EN, the speed limit information about each candidate route in step S02; the speed limit information about each candidate route represents a value of the legal speed limit on each point defined along the corresponding candidate route.

If the value of the legal speed limit on each point defined along each candidate route varies by time of day, the processor 100a can retrieve, from the traffic information server EN, a future value of the legal speed limit on each point defined along each candidate route at a scheduled time at which the target vehicle dispatch service will be provided. Alternatively, the processor 100a can retrieve, from the traffic information server EN, an actual value of the legal speed limit on each point defined along each candidate route.

Next, the processor 100a serves as, for example, the evaluation index database creator 12a to access the traffic information server EN to thereby retrieve, from the traffic information server EN, the traffic jam information about each candidate route in step S03. The traffic jam information about each candidate route for example includes (i) Whether there is a traffic jam on each point defined along the corresponding candidate route (ii) The degree of, upon determination that there is a traffic jam on at least one point defined along at least one candidate route, the traffic jam on the at least one point defined along the at least one candidate route In step S03, the processor 100a can retrieve, from the traffic information server EN, the traffic jam information about each candidate route at the scheduled time at which the target vehicle dispatch service will be provided. Alternatively, the processor 100a can retrieve, from the traffic information server EN, the traffic jam information about each candidate route at a present time.

In step S03, the processor 100a can predict the traffic jam information about each candidate route at the scheduled time or the present time in accordance with previous histories of the traffic jam information.

Following the operation in step S03, the processor 100a serves as, for example, the evaluation index database creator 12a to predict, for each candidate route, how the speed of each vehicle MV changes assuming that the corresponding vehicle MV travels along the corresponding candidate route in accordance with, for example, (i) the route information, (ii) the speed limit information, and (iii) the traffic jam information about the corresponding candidate route in step S04.

Specifically, the processor 100a serves as, for example, the evaluation index database creator 12a to calculate a predicted value of the speed of each vehicle MV on each point defined along each candidate route assuming that the corresponding vehicle MV travels along the corresponding candidate route in step S04. Then, the processor 100a serves as, for example, the evaluation index database creator 12a to store, in the storage 14, a series of the predicted values of the speed of each vehicle MV at the respective points along each candidate route as a predicted change of the speed of each vehicle MV for each candidate route in step S04.

Figure 4A:
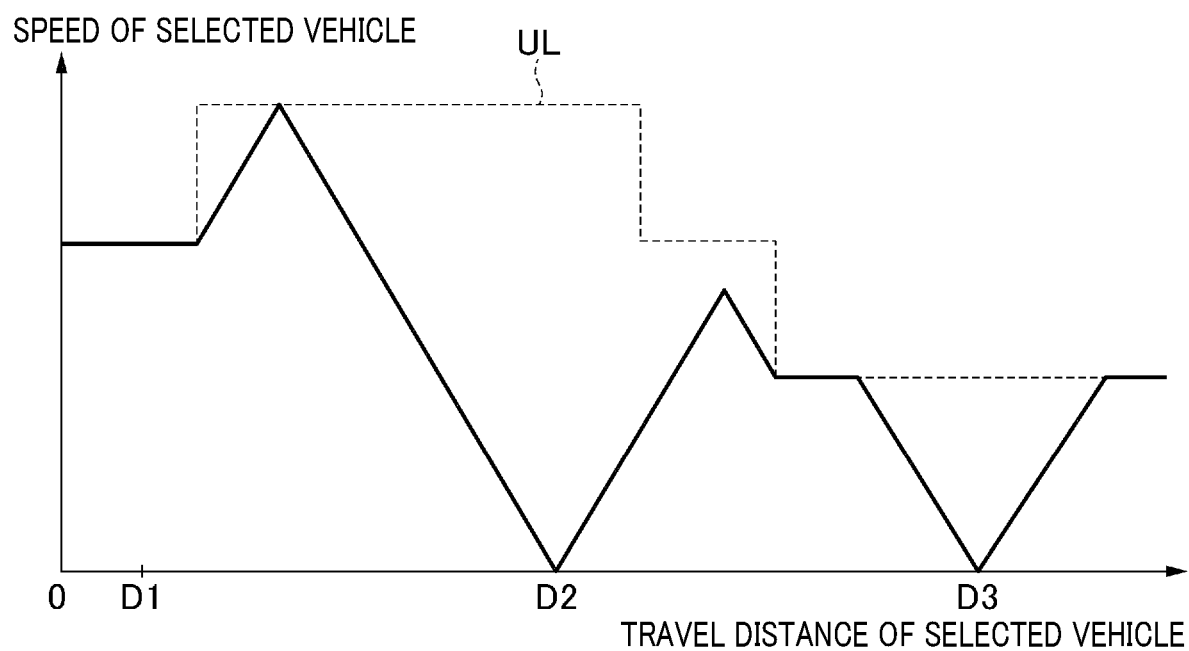
FIG. 4A is a graph schematically illustrating an example of a predicted change of the speed of a vehicle selected from vehicles for a selected candidate route according to the exemplary embodiment.

FIG. 4A schematically illustrates, as a graph, an example of the predicted change of the speed of a vehicle selected from the vehicles MV for a selected candidate route, which is created in step S04.

The horizontal axis of the graph shows a travel distance of the selected vehicle along the selected candidate route, that is, a location of the selected vehicle at each point along the selected candidate route. The vertical axis of the graph shows the speed of the selected vehicle.

That is, a solid curve in the graph shows that how predicted values of the speed of the selected vehicle at the respective points defined along the selected candidate route change.

In particular, in FIG. 4A, a dashed line UL represents values of the legal speed limit on the respective points defined along the selected candidate route, which is included in the speed limit information obtained in step S03. Additionally, reference characters D1, D2, and D3 represent locations of the selected candidate where the corresponding traffic lights are respectively installed.

That is, as clearly seen in the graph of FIG. 4A, the processor 100a predicts, for each candidate route, how the speed of each vehicle MV changes assuming that the corresponding vehicle MV travels along the corresponding candidate route basically under a predetermined condition where (1) The corresponding vehicle MV travels on each point defined along the corresponding candidate route at a speed that is as close as possible to the legal speed limit on the corresponding point (2) The corresponding vehicle MV stops at each of the locations where the corresponding one of the traffic lights are installed with a predetermined probability Specifically, in the graph of FIG. 4A, at the location D1, the selected vehicle does not stop because the traffic light is green, but, at each of the locations D2 and D3, the selected vehicle stops because the corresponding traffic light is red or yellow.

A value of the probability for each traffic light can be variably set based on a predetermined cycle through green-yellow-red for the corresponding traffic light or set to a fixed value.

A stop time interval for which each vehicle MV has stopped when the corresponding vehicle MV stop at a location where a traffic light is installed can be set to a predicted stop time interval, such as an average stop time interval, based on previous histories of the stop time intervals of the corresponding vehicle MV. The stop time interval of each vehicle MV can alternatively set to a fixed value.

A value of deceleration when each vehicle MV is stopping at a location where a corresponding traffic light is installed can be set to a predetermined fixed value, and a value of acceleration when each vehicle MV, which was stopped at location where a corresponding traffic light is installed, is starting from the location can also be set to a predetermined fixed value.

In step S04, the processor 100a can be configured to predict, for each candidate route, how the speed of each vehicle MV changes assuming that the corresponding vehicle MV travels along the corresponding candidate route in consideration of (i) the route information about the corresponding candidate route, i.e., the slope and curvature of each point defined along the corresponding candidate route, and (ii) the traffic jam information about the corresponding candidate route.

In step S04, the processor 100a can be configured not to perform the above prediction, but to cause one of the external servers EN to perform a traffic simulation for each candidate route to accordingly create the predicted change of the speed of each vehicle MV for each candidate route.

Following the operation in step S04, the processor 100a obtains, from each vehicle MV, values of respective parameters in step S05. The parameters of each vehicle MV for example include (1) The total weight of the corresponding vehicle MV (2) The power consumption by each of various power consumer devices installed in the corresponding vehicle MV, such as an air conditioner (3) The energy utilization efficiency of the corresponding vehicle MV (4) The configuration of the body of the corresponding vehicle MV For example, if each vehicle MV includes an internal combustion engine, an operating efficiency and a power transmission efficiency of the internal combustion engine can be included in the energy utilization efficiency of each vehicle MV. If each vehicle MV includes a rotary electric machine, an operating efficiency and a power transmission efficiency of the rotary electric machine can be included in the energy utilization efficiency of each vehicle MV.

The processor 100a can be configured to calculate the power consumption by each of various power consumer devices installed in the corresponding vehicle MV in accordance with, for example, previous histories of the quantity of consumed power of the corresponding one of the various power consumer devices.

As described later, the parameters of each vehicle MV are required for the evaluation index database creator 12a to calculate, for each candidate route, a value of the evaluation index for the corresponding vehicle MV.

Following the operation in step S05, the processor 100a serves as, for example, the evaluation index database creator 12a to calculate, for each candidate route, a value of the evaluation index for each vehicle MV assuming that the vehicle MV travels through the corresponding candidate route in step S06.

The following describes a specific method of calculating, for each candidate route, a value of the evaluation index for each vehicle MV assuming that the vehicle MV travels through the corresponding candidate route in step S06.

The following equation (1) is a motion equation for each vehicle MV and each candidate route:

$$F_{drv}(t) = m\frac{dv(t)}{dt} + F_r(v(t)) + mg\sin\theta(t) + F_c(t) \qquad (1)$$

where:

$F_{drv}(t)$ at the left side of the motion equation (1) represents the magnitude of drive power generated by the internal combustion engine or rotary electric machine of the corresponding vehicle MV, which is expressed as a function of time (t);

m at each of the first and third terms of the right side of the motion equation (1) represents the total weight of the corresponding vehicle MV including the weight of at least one load to be transported;

v(t) at the first term of the right side of the motion equation (1) represents the speed of the corresponding vehicle MV traveling through the corresponding candidate route, which is expressed as a function of time (t);

$F_r(v(t))$ at the second term of the right side of the motion equation (1) represents external force, such as the sum of rolling resistance and air resistance, acting on the corresponding traveling vehicle MV, which is expressed as a function of time (t);

g at the third term of the right side of the motion equation (1) represents gravity acceleration;

θ(t) at the third term of the right side of the motion equation (1) represents an angle of the corresponding vehicle MV with respect to horizontal plane perpendicular to the gravity acceleration, which is expressed as a function of time (t); and $F_c(t)$ at the fourth term of the right side of the motion equation (1) represents the increment of the rolling resistance applied to the corresponding vehicle MV traveling through the corresponding candidate route that is a curve, which is expressed as a function of time (t).

That is, the predicted change of the speed of each vehicle MV for each candidate route created in step S04 can be used as the above speed v(t) of the corresponding vehicle MV traveling through the corresponding candidate route.

The external force $F_r(v(t))$ for each vehicle MV and each candidate route can be calculated using, for example, (I) a predetermined equation that has been experimentally obtained, and (II) at least one of the parameters, such as the configuration of the body of the corresponding vehicle MV, obtained in step S04.

The angle θ(t) for each vehicle MV and each candidate route takes a positive value if the corresponding vehicle MV travels through the corresponding candidate route that is a rising slope with respect to the horizontal plane, and a negative value if the corresponding vehicle MV travels through the corresponding candidate route that is a falling slope with respect to the horizontal plane.

That is, the third term mg sin θ(t) at the right side of the motion equation (1) for each vehicle MV and each candidate route represents a component of gravity applied to the corresponding vehicle MV traveling through the corresponding candidate route in accordance with the slope of the corresponding candidate route; the component of gravity is directed along the traveling direction of the corresponding vehicle MV.

The rolling-resistance increment $F_c(t)$ for each vehicle MV and each candidate route varies depending on the speed of the corresponding vehicle MV and the curvature of the corresponding candidate route, and can be calculated using a known equation. The rolling-resistance increment $F_c(t)$ for each vehicle MV and each candidate route can be calculated using, for example, a predetermined equation that has been experimentally obtained.

Hereinafter, power that should be outputted from the internal combustion engine or rotary electric machine installed in each vehicle MV at each value of time (t), that is, work that should be done by the internal combustion engine or rotary electric machine installed in each vehicle MV per unit of time (t), will be referred to as $P_{drv}(t)$. Then, the power $P_{drv}(t)$ of each vehicle MV for each candidate route can be calculated in accordance with the following equation (2):

$$P_{drv}(t)=F_{drv}(t)v(t)+P_{aux} \quad (2)$$

where $P_{aux}$ at the second term of the right side of the equation (2) represents power required to drive the various power consumer devices installed in the corresponding vehicle MV. That is, the power $P_{drv}(t)$ of each vehicle MV represents the sum of power required to cause the corresponding vehicle MV to travel at the speed v(t) and power required to drive the various power consumer devices installed in the corresponding vehicle MV.

That is, the power $P_{aux}$ of each vehicle MV for each candidate route can be calculated in accordance with (1) The route information about the corresponding candidate route, i.e., the slope and curvature, of each point defined along the corresponding candidate route (2) The predicted change v(t) of the speed of the corresponding vehicle MV for the corresponding candidate route created in step S04

(3) The values of the respective parameters, which include the total weight of the corresponding vehicle MV and the power consumption by each of the various power consumer devices, of the corresponding vehicle MV obtained in step S05

If a part of at least one term included in the motion equation (1) cannot be calculated because the slope or curvature is not included in the route information about the corresponding candidate route, the function $F_{drv}(t)v(t)$ included in the equation (2) can be calculated in accordance with the motion equation (1) whose at least one term is zero or is set to a predetermined fixed value.

If each vehicle MV is configured as the first type vehicle driven based on drive power generated by the internal combustion engine, fuel energy consumed by the corresponding vehicle MV per unit of time can be calculated in accordance with the following equation (3) assuming that the corresponding vehicle MV is equipped with a continuously variable transmission (CVT) that can change seamlessly through a continuous range of gear ratios of the corresponding vehicle MV, so that the power transmission from the internal combustion engine to the drive wheels of the corresponding vehicle MV is performed at the maximum efficiency:

$$P_{fuel} = \frac{P_{drv}}{\eta_{eng}(P_{eng})\eta_{mec}} \quad (3)$$

where:

$P_{fuel}$ at the left side of the equation (3) represents the fuel energy consumed by the corresponding vehicle MV per unit of time;

$P_{drv}$ at the numerator of the right side of the equation (3) represents the power $P_{drv}(t)$ of the corresponding vehicle MV, which is calculated in accordance with the equation (2);

$P_{eng}$ at the denominator of the right side of the equation (3) represents output power of the internal combustion engine;

$\eta_{eng}(P_{eng})$ at the denominator of the right side of the equation (3) represents the operating efficiency of the internal combustion engine, which is expressed as a function of the output power $P_{eng}$ of the internal combustion engine and is set to a value lower than 1; and $\eta_{mec}$ at the denominator of the right side of the equation (3) represents the power transmission efficiency between the internal combustion engine and drive wheels of the corresponding vehicle MV, which is set to a value lower than 1.

The operating efficiency $\eta_{eng}(P_{eng})$ each vehicle MV can be set to a fixed value independently of the output power $P_{eng}$ of the internal combustion engine.

As described above, the equation (3) for each vehicle MV is based on the fact that the corresponding vehicle MV is equipped with the continuously variable transmission, so that the power transmission from the internal combustion engine to the drive wheels of the corresponding vehicle MV is performed at the maximum efficiency. Alternatively, if each vehicle MV is configured to provide a limited number of the gear ratios in fixed steps, it is possible to calculate the fuel energy $P_{fuel}$ of the corresponding vehicle MV using an equation where the power transmission efficiency $\eta_{mec}$ varies depending on specific parameters. As the operating efficiency $\eta_{eng}(P_{eng})$ of each vehicle MV, an experimentally calculated value or equation can be used. Similarly, as the power transmission efficiency $\eta_{mec}$, an experimentally calculated value or equation can be used.

The fuel energy $P_{fuel}$ of each vehicle MV for each candidate route, which is calculated in accordance with the equation (3), represents the fuel energy consumed by the corresponding vehicle MV per unit of time assuming that the corresponding vehicle MV travels through the corresponding candidate route. For this reason, integrating the fuel energy $P_{fuel}$ of each vehicle MV for each candidate route with respect to time required for the corresponding vehicle MV to have completely traveled through the corresponding candidate route enables calculation of integrated fuel energy $P_{fuel}$ of the corresponding vehicle MV for the corresponding candidate route. The integrated fuel energy $P_{fuel}$ of each vehicle MV for each candidate route represents the energy consumption of the corresponding vehicle MV for the corresponding candidate route, and therefore, a value of the energy consumption of each vehicle MV for each candidate route represents a value of the evaluation index for the corresponding vehicle MV for the corresponding candidate route.

If the quantity of carbon dioxide emissions from each vehicle MV for each candidate route is used as the evaluation index for the corresponding vehicle MV for the corresponding candidate route, multiplying the integrated fuel energy $P_{fuel}$ of each vehicle MV for each candidate route by a predetermined first coefficient depending on the performance of the corresponding vehicle MV enables the quantity of carbon dioxide emissions from the corresponding vehicle MV for the corresponding candidate route to be calculated.

Similarly, if the cost required for the travel of each vehicle MV through each candidate route is used as the evaluation index for the corresponding vehicle MV for the corresponding candidate route, multiplying the integrated fuel energy $P_{fuel}$ of each vehicle MV for each candidate route by a predetermined second coefficient determined based on the price of used fuel enables the cost required for the travel of the corresponding vehicle MV through the corresponding candidate route to be calculated.

Otherwise, if each vehicle MV is configured as the second type vehicle driven based on drive power generated by the rotary electric machine, electrical energy consumed by the corresponding vehicle MV for each candidate route per unit of time can be calculated in accordance with the following equations (4a) and (4b):

$$P_{elc} = \begin{cases} \dfrac{P_{drv}}{\eta_{mot}(N_{mot}, T_{mot})\eta_{mec}} + P_{btl} & (P_{drv} \geq 0) \quad \ldots \quad (4a) \\ \eta_{mot}(N_{mot}, T_{mot})\eta_{mec}P_{drv} + P_{btl} & (P_{drv} < 0) \quad \ldots \quad (4b) \end{cases}$$

where:

$P_{elc}$ at the left side of each equation (4a), (4b) represents the electrical energy consumed by the corresponding vehicle MV for each candidate route per unit of time;

$N_{mot}$ at the right side of each equation (4a), (4b) represents the number of revolutions of the rotary electric machine;

$T_{mot}$ at the right side of each equation (4a), (4b) represents the torque of the rotary electric machine;

$\eta_{mot}(N_{mot}, T_{mot})$ at the right side of each equation (4a), (4b) represents the operating efficiency of the rotary electric machine, which is expressed as a function of the number of revolutions $N_{mot}$ of the rotary electric machine and the torque $T_{mot}$ of the rotary electric machine, and is set to a value lower than 1;

$\eta_{mec}$ at the right side of each equation (4a), (4b) represents the power transmission efficiency between the rotary electric machine and the drive wheels of the corresponding vehicle MV, which is set to a value lower than 1; and $P_{btl}$ at the right side of each equation (4a), (4b) represents a loss caused by input and/or output of electrical power to and/or from a battery installed in the corresponding vehicle MV.

If the power $P_{drv}(t)$ of each vehicle MV for each candidate route is negative ($P_{drv}<0$), regenerative braking is carried out in the corresponding vehicle MV, so that electrical power generated by the rotary electric machine during the regenerative braking is stored in the battery, resulting in the electrical energy $P_{elc}$ consumed by the corresponding vehicle MV for the corresponding candidate route becoming negative.

For this reason, the electrical energy $P_{elc}$ consumed by each vehicle MV for each candidate route per unit of time is represented by (1) The equation (4a) of $$\dfrac{P_{drv}}{\eta_{mot}(N_{mot}, T_{mot})\eta_{mec}} + P_{btl}$$

if the power $P_{drv}(t)$ is higher than or equal to 0

(2) The equation (4b) of $\eta_{mot}(N_{mot}, T_{mot})\eta_{mec}P_{drv}+P_{btl}$ if the power $P_{drv}(t)$ is lower than 0

The loss $P_{btl}$ caused by input and/or output of electrical power to and/or from the battery installed in the corresponding vehicle MV can be calculated in accordance with the following equation (5) based on Ohm's law:

$$P_{btl} = R_{bat}\left(\dfrac{P_{bat}}{V_{bat}}\right)^2 \quad (5)$$

wherein:

$R_{bat}$ at the right side of the equation (5) represents an internal resistance of the battery;

$V_{bat}$ at the right side of the equation (5) represents a terminal voltage across the battery; and $P_{bat}$ at the right side of the equation (5) represents input and/or output battery power to and/or from the battery, that is, a value of electric energy input and/or output to and/or from the battery per unit of time.

The input and/or output battery power $P_{bat}$ to and/or from the battery can be calculated in accordance with the following equations (6a) and (6b):

$$P_{bat}(P_{drv}) = \begin{cases} \dfrac{P_{drv}}{\eta_{mot}\eta_{mec}} & (P_{drv} \geq 0) \quad \ldots \quad (6a) \\ \eta_{mot}\eta_{mec}P_{drv} & (P_{drv} < 0) \quad \ldots \quad (6b) \end{cases}$$

wherein:

$P_{bat}(P_{drv})$ at the left side of each equation (6a), (6b) represents the input and/or output battery power $P_{bat}$ to and/or from the battery, which is expressed as a function of the power $P_{drv}(t)$ of the corresponding vehicle M $\eta_{mot}$ at the right side of each equation (6a), (6b) represents the operating efficiency $\eta_{mot}(N_{mot},T_{mot})$ described above; and $P_{drv}$ at the right side of each equation (6a), (6b) represents the power $P_{drv}(t)$ of the corresponding vehicle MV, which is calculated in accordance with the equation (2).

The electrical energy $P_{ecl}$ of each vehicle MV for each candidate route, which is calculated in accordance with the equation (4), represents the electrical energy consumed by the corresponding vehicle MV per unit of time assuming that the corresponding vehicle MV travels through or along the corresponding candidate route. For this reason, integrating the electrical energy $P_{ecl}$ of each vehicle MV for each candidate route with respect to time required for the corresponding vehicle MV to have completely traveled through or along the corresponding candidate route enables calculation of integrated electrical energy $P_{ecl}$ of the corresponding vehicle MV for the corresponding candidate route. The integrated electrical energy $P_{ecl}$ of each vehicle MV for each candidate route represents the energy consumption of the corresponding vehicle MV for the corresponding candidate route, and therefore, a value of the energy consumption of each vehicle MV for each candidate route represents a value of the evaluation index for the corresponding vehicle MV for the corresponding candidate route.

If the quantity of carbon dioxide emissions from each vehicle MV for each candidate route is used as the evaluation index for the corresponding vehicle MV for the corresponding candidate route, multiplying the integrated electrical energy $P_{ecl}$ of each vehicle MV for each candidate route by a predetermined third coefficient enables the quantity of carbon dioxide emissions, which is caused by the energy consumption of the corresponding vehicle MV, from the corresponding vehicle MV for the corresponding candidate route to be calculated.

The quantity of carbon dioxide emissions from each vehicle MV for each candidate route for the case where the corresponding vehicle MV is driven based on the drive power generated by the rotary electric machine does not mean the quantity of carbon dioxide emissions directly discharged from the corresponding vehicle MV, but means the quantity of carbon dioxide emissions discharged from, for example, a power plant when the power plant generates electrical power required for the corresponding vehicle MV to travel through the corresponding candidate route.

Similarly, if the cost required for the travel of each vehicle MV through each candidate route is used as the evaluation index for the corresponding vehicle MV for the corresponding candidate route, multiplying the integrated electrical energy $P_{ecl}$ of each vehicle MV for each candidate route by a predetermined fourth coefficient determined based on the price of electrical power enables the cost required for the travel of the corresponding vehicle MV through the corresponding candidate route to be calculated.

As described in detail above, the processor 100a serves as, for example, the evaluation index database creator 12a to calculate, for each candidate route, a value of the evaluation index for each vehicle MV assuming that the vehicle MV travels through the corresponding candidate route using one or more of the above equations (1) to (6b) in step S06.

That is, the values of the evaluation index for the respective vehicles MV, i.e., the respective models (types) of the vehicles MV, for each candidate route are created in step S06.

Then, the processor 100a serves as, for example, the evaluation index database creator 12a to collect the values of the evaluation index for the respective vehicles MV for each candidate route as the evaluation index table in step S06.

That is, the evaluation index table for each candidate route created in step S06 represents a relationship between the values of the evaluation index for the respective vehicles MV and the corresponding candidate route.

More specifically, the total weight of each of the vehicles MV, which includes its own weight of the corresponding one of the vehicles MV and the weight of at least one load to be transported by the corresponding one of the vehicles MV, may be different from one another.

For this reason, assuming that the vehicles MV are first to Nth (N is an integer more than or equal to 2) vehicles MV, the processor 100a serves as, for example, the evaluation index database creator 12a to (1) Set plural total weights that each vehicle MV can have
(2) Calculate, for each candidate route, a value of the evaluation index for each total weight of each vehicle MV assuming that the corresponding vehicle MV having the corresponding total weight travels through the corresponding candidate route using one or more of the above equations (1) to (6b) in step S06.

Then, the processor 100a serves as, for example, the evaluation index database creator 12a to collect the values of the evaluation index for the respective total weights of each vehicle MV for each candidate route as the evaluation index table in step S06.

For example, let us assume that the candidate routes are first to nth candidate routes R1 to Rn (n is an integer greater than or equal to 2), the vehicles MV respectively have different first to mth types (models) A1 to Am (m is an integer greater than or equal to 2), and the vehicles MV can have one of predetermined total weights W1 to Wp (p is an integer greater than or equal to 2).

In this assumption, FIG. 4B schematically illustrates, as an example of the evaluation index tables, evaluation index tables T1 to Tn for the respective first to nth candidate routes R1 to Rn.

Specifically, in the evaluation index table T1 for the first candidate route R1, values X1(A1)1 to X1(A1)p of the evaluation index for the respective total weights W1 to Wp of the first vehicle MV having the first type A1, values X1(A2)1 to X1(A2)p of the evaluation index for the respective total weights W1 to Wp of the second vehicle MV having the second type A2, . . . , and values X1(Am)1 to X1(Am)p of the evaluation index for the respective total weights W1 to Wp of the mth vehicle MV having the mth type Am are correlated with the corresponding first candidate route R1.

In the evaluation index table Tn for the nth candidate route Rn, values Xn(A1)1 to Xn(A1)p of the evaluation index for the respective total weights W1 to Wp of the first vehicle MV having the first type A1, values Xn(A2)1 to Xn(A2)p of the evaluation index for the respective total weights W1 to Wp of the second vehicle MV having the second type A2, . . . , and values Xn(Am)1 to Xn(Am)p of the evaluation index for the respective total weights W1 to Wp of the mth vehicle MV having the mth type Am are correlated with the corresponding nth candidate route Rn. The remaining second to (n−1)th evaluation index tables T2 to T(n−1) are created in the same manner as the first and nth evaluation index tables T1 and Tn.

Next, the processor 100a serves as, for example, the evaluation index database creator 12a to collect the evaluation index tables for the respective candidate routes to accordingly create the evaluation index database DB based on the collected evaluation index tables for the respective candidate routes in step S07.

Following the operation in step S07, the processor 100a serves as, for example, the evaluation index database creator 12a to store the evaluation index database DB in the storage 14 in step S08.

As described above, the processor 100a is programmed to perform the evaluation index database creating routine illustrated in FIG. 3 at a point of time before the rollout of the target vehicle dispatch service from the service provider. This therefore results in the evaluation index database DB, which is required to calculate, for each vehicle-dispatch plan candidate created by the candidate creator 11, a value of the evaluation index for each vehicle MV, being stored in the storage 14.

It is preferable to update information stored in the evaluation index database DB to up-to-date information as frequent as possible. For this reason, the processor 100a can be programmed to repeatedly perform, every predetermined cycle, the evaluation index database creating routine within a period before the rollout of the target vehicle dispatch service from the service provider. This makes it possible to update information stored in the evaluation index database DB in the storage 14 based on the latest traffic-jam information and/or the latest speed limit information.

For example, the processor apparatus 100 is configured to create a vehicle dispatch plan at a time immediately before the scheduled time at which the target vehicle dispatch service will be provided.

The following describes a vehicle dispatch plan creating routine carried out by the processor apparatus 100, i.e., the processor 100a, with reference to FIG. 5.

When launching the vehicle dispatch plan creating routine, the processor 100a of the processor apparatus 100 serves as, for example, the candidate creator 11 to retrieve, from the evaluation index database DB stored in the storage 14, which has already created and stored in the storage 14, the evaluation index tables for the respective candidate routes in step S11. That is, the evaluation index table for each candidate route represents a relationship between the values of the evaluation index for the respective total weights of each vehicle MV and the corresponding candidate route (see FIGS. 3 and 4B).

Following the operation in step S11, the processor 100a serves as, for example, the candidate creator 11 to retrieve, from the storage 14, all the reservation information items inputted from users in step S12. This enables the processor 100a to read, from each of the reservation information items about the corresponding user, 1. The number of at least one passenger who is going to embark on any one of the vehicles MV if the at least one passenger is at least one load to be transported by any one of the vehicles MV
2. An embarkation waypoint selected from the waypoints P0 to P4 where the at least one passenger is going to embark on any one of the vehicles MV
3. A disembarkation waypoint selected from the waypoints P0 to P4 where the at least one passenger is going to disembark off the selected one of the vehicles MV Subsequently to the operation in step S12, the processor 100a serves as, for example, the candidate creator 11 to retrieve, from each vehicle MV, vehicle information indicative of whether the corresponding vehicle MV is useable at the scheduled time of the target vehicle dispatch service in step S13. This enables the processor 100a to specify one or more vehicles included in the vehicles MV; the specified vehicles are useable at the scheduled time of the target vehicle dispatch service. In other words, the processor 100a eliminates one or more vehicles, which are determined to be unusable at the scheduled time of the target vehicle dispatch service, included in the vehicles MV from the vehicles MV to accordingly specify the remaining one or more vehicles that are useable at the scheduled time of the target vehicle dispatch service.

For example, the vehicle information on a vehicle MV represents that maintenance of the vehicle MV is going to be performed at the scheduled time of the target vehicle dispatch service, so that the vehicle MV is not useable at the scheduled time of the target vehicle dispatch service. As another example, the vehicle information on a vehicle MV represents that the battery of the vehicle MV is going to be charged at the scheduled time of the target vehicle dispatch service, so that the vehicle MV is not useable at the scheduled time of the target vehicle dispatch service.

That is, vehicles, which are specified to be usable in the vehicles MV at the scheduled time of the target vehicle dispatch service, will be referred to as usable vehicles MVU.

Next, the processor 100a serves as, for example, the candidate creator 11 to retrieve, from, for example, the traffic information server EN and/or the reservation information items stored in the storage 14, the limiting conditions in step S14. The limiting conditions are used for the candidate creator 11 to create vehicle-dispatch plan candidates.

The limiting conditions may include a limiting condition that the useable vehicles MVU cannot travel along at least one candidate route because the at least one candidate route is closed due to, for example, construction work. The limiting conditions may include a limiting condition that, if at least one candidate route becomes a one-way route in a predetermined time zone, prevents the useable vehicles MVU from traveling the wrong way on the at least one candidate route, i.e., the one-way route. The limiting conditions may include a limiting condition that reliably transfers each of the passengers from a corresponding place of departure to a desired destination.

The limiting conditions may include a limiting condition that specifies an individual final waypoint for each useable vehicle MVU where the corresponding useable vehicle MVU has finally reached at the completion of the target vehicle dispatch service in order to avoid many vehicles included in the useable vehicle MVU from gathering together at any of the waypoints. The limiting conditions may include a limiting condition that specifies a geofenced area in a region where the target vehicle dispatch service is provided; in the geofenced area, one or more specific vehicles, such as one or more second type vehicles each driven based on drive power generated by the rotary electric machine installed therein, are only permitted to travel. That is, the remaining vehicles MVU other than the one or more specific vehicles permitted to travel in the geofenced area are limited to travel through one or more candidate routes located outside the geofenced area.

Following the operation in step S14, the processor 100a serves as, for example, the candidate creator 11 to create, in step S15, vehicle-dispatch plan candidates for the target vehicle dispatch service in accordance with
(1) The evaluation index tables for the respective candidate routes retrieved in step S11
(2) All the reservation information items inputted from the users retrieved in step S12
(3) The vehicle information for each vehicle MV retrieved in step S13
(4) The limiting conditions retrieved in step S14

Specifically, the processor 100a serves as, for example, the candidate creator 11 to create, in step S15, all the vehicle-dispatch plan candidates that are implementable under the vehicle information about each vehicle MV and the limiting conditions while each of the vehicle-dispatch plan candidates satisfies all the reservation information items. Alternatively, if a predetermined upper limit is determined to the number of vehicle-dispatch plan candidates to be created by the processor 100a, the processor 100a serves as, for example, the candidate creator 11 to create, in step S15, a predetermined number of vehicle-dispatch plan candidates, which matches the predetermined upper limit; the predetermined number of vehicle-dispatch plan candidates are implementable under the vehicle information about each vehicle MV and the limiting conditions while satisfy all the reservation information items.

That is, as described above, each vehicle-dispatch plan candidate created in step S15, which satisfies all the reservation information items, can include
(1) The first information about how each usable vehicle MVU is scheduled to travel through waypoints selected from all the waypoints that are disposed in the predetermined service region and are travelable by the vehicles MV, that is, through routes selected from all the routes that are disposed in the predetermined service region and are travelable by the vehicles MV
(2) The second information about the number of passengers, for each of the waypoints selected by the usable vehicles MVU, who get on or off at least one of the usable vehicles MVU when the at least one of the usable vehicles stops at the corresponding one of the waypoints selected by the usable vehicles MVU In other words, each vehicle dispatch plan candidate created in step S15 can include, as the second information, information about, for each of the routes selected by the usable vehicles MVU, the number of loads, i.e., passengers, carried out by at least one of the usable vehicles MVU when the at least one of the usable vehicles MVU travels through the corresponding one of the routes selected by the usable vehicles MVU.

Each vehicle dispatch plan candidate created in step S15 can include information about a range of carrier routes included in the selected routes for each suable vehicle MVU when the corresponding usable vehicle MVU should travel through the range of the carrier routes while carrying at least one load, i.e., at least one passenger.

Following the operation in step S15, the processor 100a serves as, for example, the candidate evaluation index calculator 12b to calculate, for each vehicle-dispatch plan candidate created in step S15, a value of the evaluation index for each of the usable vehicles MVU based on the evaluation index tables of the candidate routes included in the corresponding vehicle-dispatch plan candidate assuming that each of the usable vehicles MVU travels through one or more of the candidate routes defined by the corresponding vehicle-dispatch plan candidate in step S16.

Then, the processor 100a serves as, for example, the candidate evaluation index calculator 12b to calculate, for each vehicle-dispatch plan candidate created in step S15, the sum of the calculated values of the evaluation index for the respective usable vehicles MVU to accordingly obtain, for each vehicle-dispatch plan candidate created in step S15, the calculated sum of the values of the evaluation index as a value of the candidate evaluation index for the corresponding vehicle-dispatch plan candidate created in step S15.

For example, under the assumption illustrated in FIG. 4B, let us additionally assume that
(1) The usable vehicles MVU are a first vehicle and a second vehicle
(2) The first vehicle has the type A2
(3) An example vehicle-dispatch plan candidate represents that the first vehicle is scheduled to travel through the three candidate routes R1, R2, and R3
(4) The total weight in the first vehicle during the candidate route R1 is W3, and the total weight in the first vehicle during each of the candidate routes R2 and R3 is W1
(5) The second vehicle has the type A5 and the total weight W5
(6) The example vehicle-dispatch plan candidate represents that the second vehicle is scheduled to travel through the three candidate routes R1, R5, and R7
(7) The total weight in the second vehicle during the candidate route R1 is W4, and the total weight in the second vehicle during each of the candidate routes R5 and R7 is W2

In this assumption, the processor 100a serves as, for example, the candidate evaluation index calculator 12b to calculate
(I) The sum of the values X1(A2)3, X2(A2)1, and X3(A2)1 of the evaluation index for the first vehicle of the example vehicle-dispatch plan candidate
(II) The sum of the values X1(A5)4, X5(A5)2, and X7(A5)2 of the evaluation index for the second vehicle of the example vehicle-dispatch plan candidate The sum of the values X1(A2)3, X2(A2)1, and X3(A2)1 of the evaluation index for the first vehicle will be referred to as a first value of the evaluation index for the first vehicle, and the sum of the values X1(A5)4, X5(A5)2, and X7(A5)2 of the evaluation index for the second vehicle will be referred to as a second value of the evaluation index for the second vehicle.

Then, the processor 100a serves as, for example, the candidate evaluation index calculator 12b to calculate the sum of the first value of the evaluation index for the first vehicle and the second value of the evaluation index for the second vehicle as a value of the candidate evaluation index for the example vehicle-dispatch plan candidate in step S16.

That is, when the processor 100a completes the operation in step S16, values of the candidate evaluation index for the respective vehicle-dispatch plan candidates created in step S15 have been already calculated.

Following the operation in step S16, the processor 100a serves as, for example, the determiner 13 to select one of the vehicle-dispatch plan candidates created in step S15; the selected one of the vehicle-dispatch plan candidates has the lowest value of the candidate evaluation index in all the vehicle-dispatch plan candidates in step S17.

Then, the processor 100a serves as, for example, the determiner 13 to determine the selected vehicle-dispatch plan candidate as a final vehicle dispatch plan most suitable for the target vehicle dispatch service, i.e., actually used for providing the target vehicle dispatch service, in step S17.

Next, the processor 100a serves as, for example, the determiner 13 to send the determined final vehicle dispatch plan to the service-provider terminal 30 of the service provider and the vehicular system 40 of each usable vehicle MVU listed in the determined final vehicle dispatch plan in step S18, and thereafter terminates the vehicle dispatch plan creating routine.

Thereafter, the target vehicle dispatch service in accordance with the determined final vehicle dispatch plan will be provided to the users, i.e., passengers, requested to receive the target vehicle dispatch service at the scheduled time using each usable vehicle MVU listed in the determined final vehicle dispatch plan.

The final vehicle dispatch plan has the lowest value of the candidate evaluation index in all the vehicle-dispatch plan candidates. If the energy consumption of each vehicle MV is used as the evaluation index for the corresponding vehicle MV, it is possible to sufficiently reduce the energy consumption of each usable vehicle MVU in the vehicles MV resulting from provision of the target vehicle dispatch service.

If the quantity of carbon dioxide emissions from each vehicle MV is used as the evaluation index for the corresponding vehicle MV, it is possible to sufficiently reduce the quantity of carbon dioxide emissions from each usable vehicle MVU in the vehicles MV resulting from provision of the target vehicle dispatch service.

Alternatively, if the cost required for the travel of each vehicle MV is used as the evaluation index for the corresponding vehicle MV, it is possible to sufficiently reduce the cost required for the travel of each usable vehicle MVU resulting from provision of the target vehicle dispatch service.

As described in detail above, the vehicle dispatch plan creating system 10 according to the exemplary embodiment includes the candidate creator 11, the calculator 12, and the determiner 13.

The candidate creator 11 is configured to create, as vehicle-dispatch plan candidates, a plurality of candidates for a target vehicle dispatch plan.

The calculator 12 is configured to calculate, for each of the vehicle-dispatch plan candidates, a value of the evaluation index for each usable vehicle, such as a value of the energy consumption of the corresponding usable vehicle, a value of the quantity of carbon dioxide emissions from the corresponding usable vehicle, or a value of the cost required for the travel of the corresponding usable vehicle, based on the evaluation index database DB assuming that the corresponding usable vehicle travels through one or more of the candidate routes defined by the corresponding vehicle-dispatch plan candidate.

The calculator 12 is also configured to calculate, for each vehicle-dispatch plan candidate created by the candidate creator 11, the sum of the values of the evaluation index for the respective usable vehicles MVU to accordingly obtain, for each vehicle-dispatch plan candidate created by the candidate creator 11, the calculated sum of the values of the evaluation index as the value of the candidate evaluation index for the corresponding vehicle-dispatch plan candidate created by the candidate creator 11.

The determiner 13 is configured to select one of the vehicle-dispatch plan candidates created by the candidate creator 11; the selected one of the vehicle-dispatch plan candidates has the lowest value of the candidate evaluation index in all the vehicle-dispatch plan candidates.

Then, the deter miner 13 is configured to determine the selected vehicle-dispatch plan candidate as a final vehicle dispatch plan most suitable for the target vehicle dispatch service, i.e., actually used for providing the target vehicle dispatch service.

The above configuration of the vehicle dispatch plan creating system 10 according to the exemplary embodiment therefore makes it possible to sufficiently reduce the energy consumption of the useable vehicles MVU applied for the target vehicle dispatch service, the quantity of carbon dioxide emissions from the useable vehicles MVU applied for the target vehicle dispatch service, or the cost required for the travel of each useable vehicle MVU applied for the target vehicle dispatch service.

In particular, the calculator 12 is configured to calculate a value of the evaluation index for each vehicle MV or MVU based on the route information that includes the slope and/or curvature of each point defined along each candidate route.

This configuration therefore enables calculation of the value of the evaluation index for each vehicle MV or MVU more precisely in accordance with the actual profiles of the candidate routes.

Additionally, the calculator 12 is configured to calculate a value of the evaluation index for each vehicle MV or MVU based on the parameters of the corresponding vehicle MV or MVU; the parameters of each vehicle MV or MVU include the energy utilization efficiency, such as the operating efficiency $\eta_{eng}(P_{eng})$, the power transmission efficiency $\eta_{mec}$, or the operating efficiency $\eta_{mot}(N_{mot}, T_{mot})$, of the corresponding vehicle MV or MVU.

This configuration therefore enables calculation of the value of the evaluation index for each vehicle MV or MVU more precisely in accordance with the power source, i.e., the internal combustion engine or the rotary electric machine, of the corresponding vehicle MV or MVU and an actual value of the energy utilization efficiency of the corresponding vehicle MV or MVU.

The calculator 12 is configured to calculate a value of the evaluation index for each vehicle MV or MVU based on the external force, which is represented by the right side of the equation (1), acting on the corresponding traveling vehicle MV or MVU.

Calculation of the value of the evaluation index for each vehicle MV or MVU in consideration of the external force acting on the corresponding traveling vehicle MV or MV enables calculation of a value of the evaluation index for each vehicle MV or MVU more accurately.

The calculator 12 is configured to calculate a value of the evaluation index for each vehicle MV or MVU based on the predicted change of the speed of the corresponding vehicle MV or MVU for each candidate route, which is calculated in step S04 of FIG. 3.

This configuration therefore enables calculation of the value of the evaluation index for each vehicle MV or MVU more accurately in accordance with the specific traveling conditions of the corresponding vehicle MV or MVU.

The vehicle dispatch plan creating system 10 according to the exemplary embodiment is configured to calculate, for each candidate route available for the target vehicle dispatch service, a value of the evaluation index for each vehicle MV assuming that the corresponding vehicle MV travels through the corresponding candidate route, and collect the values of the evaluation index for the respective vehicles MV for each route as the evaluation index table. That is, the evaluation index table for each candidate route represents the relationship between the values of the evaluation index for the respective vehicles MV and the corresponding candidate route.

Then, the vehicle dispatch plan creating system 10 is configured to collect the evaluation index tables for the respective candidate routes to accordingly create the evaluation index database DB based on the collected evaluation index tables for the respective candidate routes. The vehicle dispatch plan creating system 10 is configured to store the evaluation index database DB in the storage 14.

The previously prepared evaluation index database DB enables calculation of the value of the evaluation index of each usable vehicle MVU for each vehicle-dispatch plan candidate in a relatively shorter time and therefore creating of the final vehicle dispatch plan in a relatively shorter time.

As described above, the final vehicle dispatch plan created by the vehicle dispatch plan creating system 10 includes a range within which each usable vehicle MVU travels while carrying one or more loads to be transported. That is, the calculator 12 is configured to calculate, for each candidate route, a value of the evaluation index for each total weight, such as the reference character m in the equation (1), of each vehicle MV or MVU assuming that the corresponding vehicle MV or MVU having the corresponding total weight travels through the corresponding candidate route.

Calculation of a value of the evaluation index for each vehicle MV or MVU for each candidate route in consideration of the total weight of the corresponding vehicle MV or MVU traveling through the corresponding candidate route results in a higher accuracy of the calculated value of the evaluation index for the corresponding vehicle MV or MVU.

As described above, the vehicle dispatch plan creating system 10 is configured to perform (1) The evaluation index database creating routine (see FIG. 3) before the rollout of the target vehicle dispatch service from the service provider (2) The vehicle dispatch plan creating routine (FIG. 5) at a time immediately before the scheduled time at which the target vehicle dispatch service will be provided to thereby calculate a value of the evaluation index for each usable vehicle based on the evaluation index database DB assuming that the corresponding usable vehicle travels through one or more of the candidate routes defined by the corresponding vehicle-dispatch plan candidate The present disclosure is however not limited to the above configuration.

Specifically, if the processor 100a of the vehicle dispatch plan creating system 10 has a sufficiently high processing rate, the processor 100a can be programmed to perform all the operations included in the evaluation index database creating routine (see FIG. 3) and included in the vehicle dispatch plan creating routine (FIG. 5). That is, the instructions of a program stored in the memory device 100b causes the processor 100a to perform all the operations included in the evaluation index database creating routine (see FIG. 3) and included in the vehicle dispatch plan creating routine (FIG. 5). In this modification, the operations in steps S07 and S08 can be eliminated.

As described above, the vehicle dispatch plan creating system 10 is configured to obtain a value of the evaluation index for each vehicle MV or MVU using specific calculations based on the route information that includes the slope and/or curvature of each point defined along each candidate route and/or the parameters, such as the operating efficiency $\eta_{eng}(P_{eng})$, of the corresponding vehicle MV or MVU.

The present disclosure is however not limited to the above configuration.

Specifically, the vehicle dispatch plan creating system 10 is configured to obtain a value of the evaluation index for each vehicle MV or MVU using specific calculations based on the route information that includes the slope and/or curvature of each point defined along each candidate route and/or the parameters, such as the operating efficiency $\eta_{eng}(P_{eng})$, of the corresponding vehicle MV or MVU.

The vehicle dispatch plan creating system 10 can however be configured to obtain, for each vehicle-dispatch plan candidate created by the candidate creator 11, a value of the candidate evaluation index for the corresponding vehicle-dispatch plan candidate using one or more machine learning algorithms each configured by, for example, a neural network; the one or more machine learning algorithms are repeatedly trained. Then, the vehicle dispatch plan creating system 10 can be configured to select one of the vehicle-dispatch plan candidates as a final vehicle dispatch plan; the selected one of the vehicle-dispatch plan candidates has the lowest value of the candidate evaluation index in all the vehicle-dispatch plan candidates.

The vehicle dispatch plan creating system 10 is configured to use, as the evaluation index for each vehicle MV, one of (i) the energy consumption of the corresponding vehicle MV, (ii) the quantity of carbon dioxide emissions from the corresponding vehicle MV, and (iii) the cost required for the travel of the corresponding vehicle MV, but the present disclosure is not limited thereto.

Specifically, the vehicle dispatch plan creating system 10 can be configured to use, as the evaluation index for each vehicle MV, two or more of (i) the energy consumption of the corresponding vehicle MV, (ii) the quantity of carbon dioxide emissions from the corresponding vehicle MV, and (iii) the cost required for the travel of the corresponding vehicle MV.

The exemplary embodiment and its modifications have been described, but the present disclosure is not limited to the above exemplary embodiment and its modifications. Various modifications, each of which is based on the exemplary embodiment to which a skilled-person's design change has been added, can be included within the scope of the present disclosure as long as each of the various modifications includes the features of the present disclosure. The arrangement, conditions, and shape of each component disclosed in the above exemplary embodiment are not limited to those of the corresponding component according to the present disclosure, and therefore are freely changed. The present disclosure can include various combinations of components described in the exemplary embodiment as long as there is no contradiction in each of the combinations.

The vehicle dispatch plan creating method and system described in the present disclosure can be implemented by a dedicated computer including a memory and a processor programmed to perform one or more functions embodied by one or more computer programs.

The vehicle dispatch plan creating method and system described in the present disclosure can also be implemented by a dedicated computer including a processor comprised of one or more dedicated hardware logic circuits.

The vehicle dispatch plan creating method and system described in the present disclosure can further be implemented by at least one dedicated computer comprised of a memory, a processor programmed to perform one or more functions embodied by one or more computer programs, and one or more hardware logic circuits.

The programs described in the present disclosure can be stored in a computer-readable non-transitory storage medium as instructions executable by a computer and/or a processor.

Each dedicated hardware logic circuit can be implemented by a digital circuit including a plurality of logic gates or an analog circuit including a plurality of logic gates. Each hardware logic circuit can also be implemented by a digital circuit including a plurality of logic gates or an analog circuit including a plurality of logic gates.

What is claimed is:

1. A system for creating a vehicle dispatch plan that represents how a plurality of vehicles are scheduled to travel, the vehicle dispatch plan creating system comprising:
    a processor configured to:
        create, as vehicle-dispatch plan candidates, a plurality of candidates for the vehicle dispatch plan;
        calculate, for each of the vehicle-dispatch plan candidates, a value of an evaluation index for each vehicle assuming that the corresponding vehicle travels in accordance with the corresponding one of the vehicle-dispatch plan candidates, the evaluation index for each vehicle including at least one of:
        (i) an energy consumption of the corresponding vehicle;
        (ii) a quantity of carbon dioxide emissions from the corresponding vehicle; and
        (iii) a cost required for a travel of the corresponding vehicle; and
        calculate, for each of the vehicle-dispatch plan candidates, a sum of the values of the evaluation index for the respective vehicles as a value of a candidate evaluation index for the corresponding one of the vehicle-dispatch plan candidates,
    wherein each of the vehicle-dispatch plan candidates includes route information about how each of the vehicles is scheduled to travel through routes selected from all predetermined routes usable by the vehicles, plural points being defined along each of the predetermined routes; and
    the processor is further configured to determine one of the vehicle-dispatch plan candidates as the vehicle dispatch plan, the determined one of the vehicle-dispatch plan candidates having the lowest value of the candidate evaluation index in all the vehicle-dispatch plan candidates; and
    the system comprises a storage that stores a relationship between each of the predetermined routes usable by the vehicles and a prepared value of the evaluation index for each vehicle assuming that the corresponding vehicle travels through the corresponding one of the predetermined routes,
    wherein the processor is further configured to:
        access the storage to retrieve, from the storage, the relationship between each of the predetermined routes usable by the vehicles and the prepared value of the evaluation index for each vehicle; and
        calculate, for each of the vehicle-dispatch plan candidates, the value of the evaluation index for each vehicle assuming that the corresponding vehicle travels through each selected route defined by the corresponding one of the vehicle-dispatch plan candidates in accordance with the relationship between each of the predetermined routes usable by the vehicles and the prepared value of the evaluation index for each vehicle assuming that the corresponding vehicle travels through the corresponding one of the predetermined routes, and
        send, to a controller of each vehicle, a drive instruction in accordance with the determined vehicle dispatch plan, the drive instruction causing the controller of each vehicle to travel in accordance with the determined vehicle dispatch plan.

2. The system according to claim 1, wherein:
    the calculator is configured to:
        calculate, for each of the vehicle-dispatch plan candidates, the value of the evaluation index for each vehicle assuming that the corresponding vehicle travels through each selected route defined by the corresponding one of the vehicle-dispatch plan candidates in accordance with at least one of a slope and a curvature of each point defined along the corresponding selected route.

3. The system according to claim 1, wherein:
    the calculator is configured to:
        calculate, for each of the vehicle-dispatch plan candidates, the value of the evaluation index for each vehicle assuming that the corresponding vehicle travels through each selected route defined by the corresponding one of the vehicle-dispatch plan candidates in accordance with an energy utilization efficiency of the corresponding vehicle.

4. The system according to claim 1, wherein:
    the calculator is configured to:
        calculate, for each of the vehicle-dispatch plan candidates, the value of the evaluation index for each vehicle assuming that the corresponding vehicle travels through each selected route defined by the corresponding one of the vehicle-dispatch plan candidates in accordance with external force acting on the corresponding vehicle.

5. The system according to claim 1, wherein:
    the calculator is configured to:
        calculate, for each of the vehicle-dispatch plan candidates, the value of the evaluation index for each vehicle assuming that the corresponding vehicle travels through each selected route defined by the corresponding one of the vehicle-dispatch plan candidates in accordance with a predicted change of a speed of the corresponding vehicle.

6. The system according to claim 1, wherein:
    each of the vehicle-dispatch plan candidates includes load information about a range of carrier routes included in the selected routes for each vehicle when the corresponding vehicle should travel through the range of the carrier routes while carrying at least one load.

7. The system according to claim 6, wherein:
    the calculator is configured to:
        calculate, for each of the vehicle-dispatch plan candidates, the value of the evaluation index for each vehicle assuming that the corresponding vehicle travels through each selected route defined by the corresponding one of the vehicle-dispatch plan candidates in accordance with a total weight of the corresponding vehicle for the corresponding selected route, the total weight of each vehicle for the range of the carrier routes included in the selected routes including a weight of the at least one load.

8. The system according to claim 1, wherein the evaluation index for each vehicle includes at least two of:
(i) the energy consumption of the corresponding vehicle;
(ii) the quantity of carbon dioxide emissions from the corresponding vehicle; and
(iii) the cost required for a travel of the corresponding vehicle.

9. The system according to claim 1, wherein the processor is configured to collect traffic-jam information about each candidate route, and update the relationship stored in the storage in accordance with the collected traffic-jam information about each candidate route.

10. The system according to claim 1, wherein the processor is configured to:
receive a reservation information item sent from each mobile communication terminal, the reservation information item including (i) a number of passengers, each of which is going to embark on a selected one of the vehicles, (ii) an embarkation waypoint where each of the passengers is going to embark on the selected one of the vehicles; and (iii) a disembarkation waypoint where each of the passenger is going to disembark off the selected one of the vehicles; and
create, as the vehicle-dispatch plan candidates, the plurality of candidates for the vehicle dispatch plan in accordance with the received information items.

11. A program product for at least one processor for creating a vehicle dispatch plan that represents how a plurality of vehicles are scheduled to travel, the program product comprising:
a non-transitory computer-readable storage medium; and
a set of program instructions embedded in the computer-readable medium, the instructions causing the at least one processor to:
create, as vehicle-dispatch plan candidates, a plurality of candidates for the vehicle dispatch plan;
calculate, for each of the vehicle-dispatch plan candidates, a value of an evaluation index for each vehicle assuming that the corresponding vehicle travels in accordance with the corresponding one of the vehicle-dispatch plan candidates, the evaluation index for each vehicle including at least one of:
(i) an energy consumption of the corresponding vehicle;
(ii) a quantity of carbon dioxide emissions from the corresponding vehicle; and
(iii) a cost required for a travel of the corresponding vehicle; and calculate, for each of the vehicle-dispatch plan candidates, a sum of the values of the evaluation index for the respective vehicles as a value of a candidate evaluation index for the corresponding one of the vehicle-dispatch plan candidates; and wherein each of the vehicle-dispatch plan candidates includes route information about how each of the vehicles is scheduled to travel through routes selected from all predetermined routes usable by the vehicles, plural points being defined along each of the predetermined routes, the instructions causing the at least one processor to determine one of the vehicle-dispatch plan candidates as the vehicle dispatch plan, the determined one of the vehicle-dispatch plan candidates having the lowest value of the candidate evaluation index in all the vehicle-dispatch plan candidates, wherein the storage medium stores a relationship between each of the predetermined routes usable by the vehicles and a prepared value of the evaluation index for each vehicle assuming that the corresponding vehicle travels through the corresponding one of the predetermined routes, wherein the instructions further cause the at least one processor to:
access the storage to retrieve, from the storage, the relationship between each of the predetermined routes usable by the vehicles and the prepared value of the evaluation index for each vehicle; and
calculate, for each of the vehicle-dispatch plan candidates, the value of the evaluation index for each vehicle assuming that the corresponding vehicle travels through each selected route defined by the corresponding one of the vehicle-dispatch plan candidates in accordance with the relationship between each of the predetermined routes usable by the vehicles and the prepared value of the evaluation index for each vehicle assuming that the corresponding vehicle travels through the corresponding one of the predetermined routes, and
send, to a controller of each vehicle, a drive instruction in accordance with the determined vehicle dispatch plan, the drive instruction causing the controller of each vehicle to travel in accordance with the determined vehicle dispatch plan.

* * * * *